United States Patent
Kobayashi et al.

(10) Patent No.: US 7,185,068 B2
(45) Date of Patent: Feb. 27, 2007

(54) CONTENT RETRIEVAL DEVICE

(75) Inventors: Takuya Kobayashi, Neyagawa (JP); Seiji Ura, Osaka (JP); Hiromi Wada, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 639 days.

(21) Appl. No.: 09/808,045

(22) Filed: Mar. 15, 2001

(65) Prior Publication Data
US 2002/0049800 A1    Apr. 25, 2002

(30) Foreign Application Priority Data
Mar. 16, 2000  (JP) .............................. 2000-073808

(51) Int. Cl.
*G06F 15/16* (2006.01)
(52) U.S. Cl. ...................... 709/219; 709/218; 709/230
(58) Field of Classification Search ................ 709/201, 709/217–219, 223, 227–231, 238, 245
See application file for complete search history.

(56) References Cited

U.S. PATENT DOCUMENTS

| 5,729,544 | A | * | 3/1998 | Lev et al. .................... 370/352 |
| 5,838,682 | A | | 11/1998 | Dekelbaum et al. |
| 5,974,430 | A | * | 10/1999 | Mutschler et al. .......... 715/505 |
| 6,052,710 | A | * | 4/2000 | Saliba et al. ................ 709/203 |
| 6,272,127 | B1 | * | 8/2001 | Golden et al. .............. 370/352 |
| 6,487,663 | B1 | * | 11/2002 | Jaisimha et al. ............ 713/193 |
| 6,515,964 | B1 | * | 2/2003 | Cheung et al. ............. 370/230 |
| 6,628,617 | B1 | * | 9/2003 | Karol et al. ................ 370/237 |

FOREIGN PATENT DOCUMENTS

| GB | 2 283 154 | 4/1995 |
| JP | 2625388 | 4/1997 |
| WO | 99/66747 | 12/1999 |

OTHER PUBLICATIONS

RFC 1738 [Dec. 1994].*

* cited by examiner

*Primary Examiner*—Glenton B. Burgess
*Assistant Examiner*—Yasin Barqadle
(74) *Attorney, Agent, or Firm*—Wenderoth, Lind & Ponack, L.L.P.

(57) ABSTRACT

In a content retrieval device, a browser section generates a retrieval request for sub-content data to be retrieved presently. A protocol control section determines which communication path between a first communication path or a second communication path should be used prior to the reception of the sub-content data which is specified by the browser section. If the protocol control section determines that the first communication path is to be used, a first communication control section receives the sub-content data which is specified by the browser section from a content server. If the protocol control section determines that the second communication path is to be used, a second communication control section receives the sub-content data from the content server. In this way, the content retrieval device can select a suitable connection method prior to the reception of data.

12 Claims, 13 Drawing Sheets

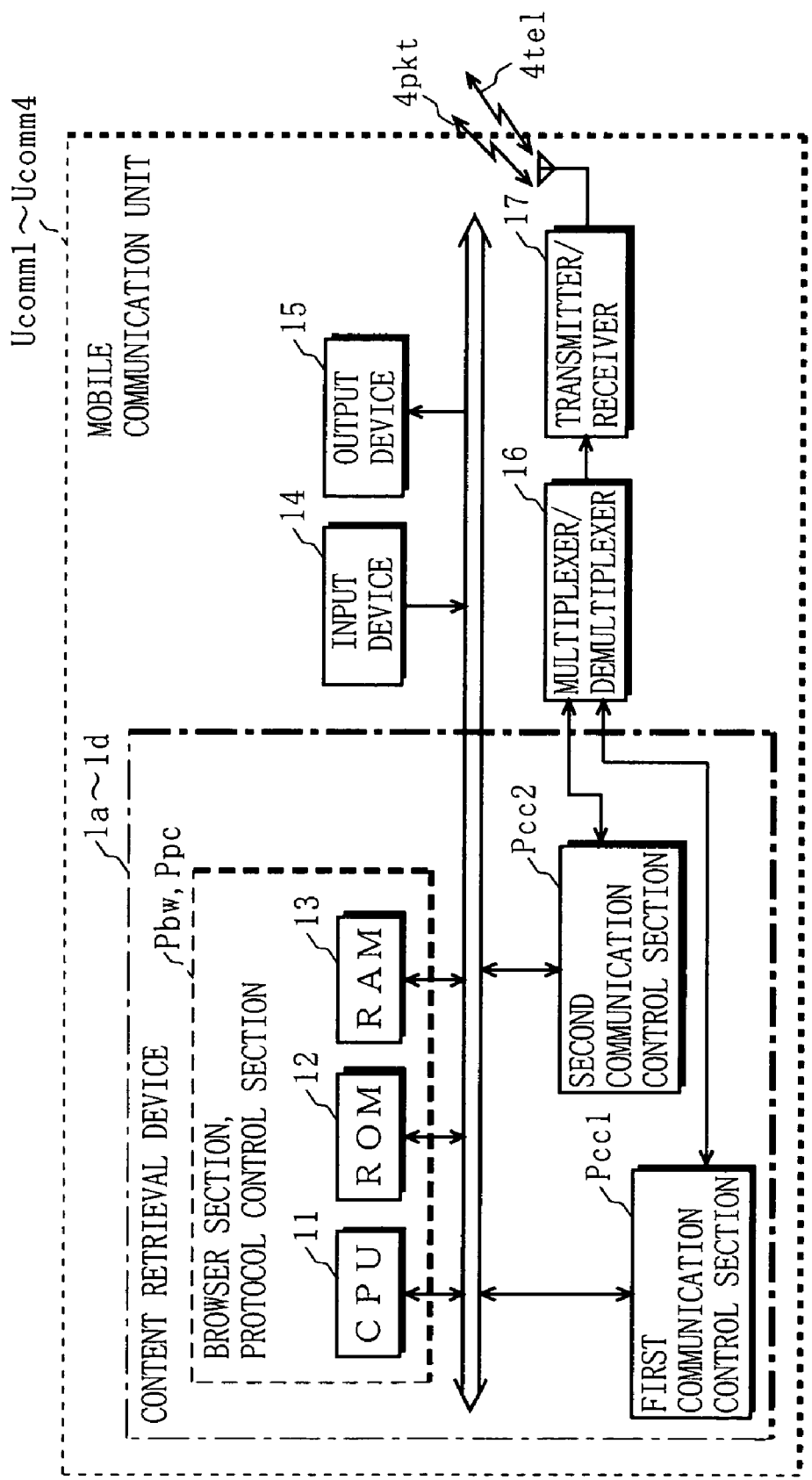

F I G. 5
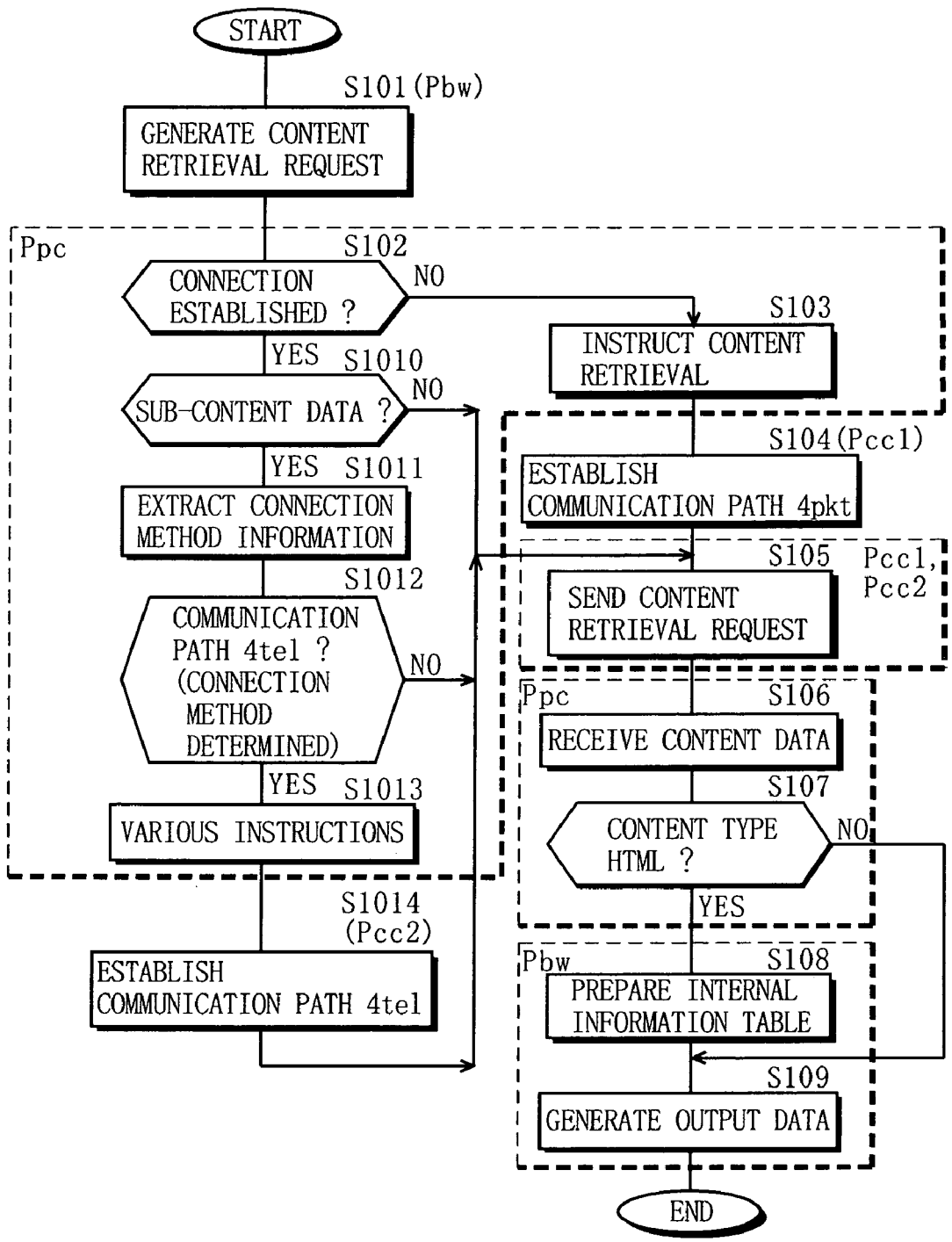

FIG. 7A

| CONTENT TYPE Ictyp | CONNECTION METHOD INFORMATION Iconn1 |
|---|---|
| text/html | packet (PACKET SWITCHING CONNECTION) |
| video/mpeg | tel (CIRCUIT SWITCHING CONNECTION) |

Tconn2

FIG. 7B

| LOCATIONAL INFORMATION Iurl | CONTENT TYPE Ictyp |
|---|---|
| url1 | text/html |
| url2 | video/mpeg |

Tctyp

F I G. 8
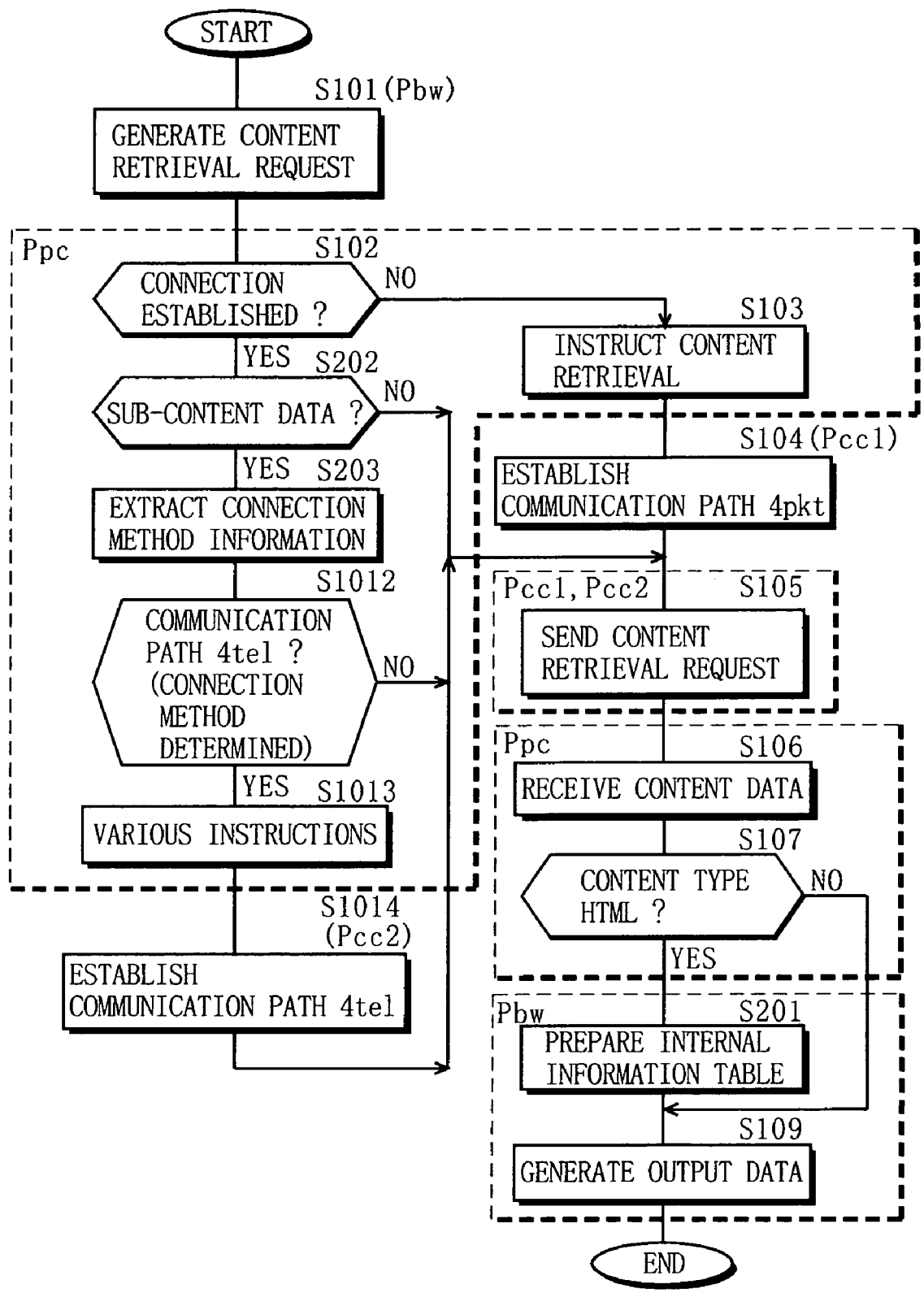

FIG. 10

| FEATURE OF LOCATIONAL INFORMATION Iurl | CONNECTION METHOD INFORMATION Iconn1 |
|---|---|
| .html | packet (PACKET SWITCHING CONNECTION) |
| .mpg | tel (CIRCUIT SWITCHING CONNECTION) |

Tconn3

CONTENT RETRIEVAL DEVICE

BACKGROUND OF THE INVENTION

1. Field of the Invention

The present invention relates to a content retrieval device, and more particularly, to a content retrieval device which is constructed to permit a plurality of connection methods to be used and which retrieves content data from a server via a communication network under an optimum connection method.

2. Description of the Background Art

In recent years, browsing of home pages (Web pages) and exchanges of emails on the Internet have attained great popularity. To access the Internet, the user operates a content retrieval device typified by a cellular phone. The content retrieval device first establishes a connection to a user-subscribing network (for example, a mobile communication network) for access to the Internet. The content retrieval device then accesses a server on the Internet and retrieves content data which is typified by a home page or an email via the network according to the operation by the user.

Conventionally, partly because of a low transfer rate in a network, servers mainly handled small-size content data such as text files and still picture files. However, with recent technological advances, the content retrieval devices have achieved enhanced performance, and the transfer rate in a network has dramatically improved. Accordingly, servers are now able to handle large-size content data such as moving picture files and audio files.

Conventional content retrieval devices access a network under either one of two connection methods; a circuit switching connection or a packet switching connection. In the circuit switching connection, one physical communication path is established between one caller and one call receiver. Since the caller and the call receiver occupy one communication path from the start of a call to the finish thereof in the circuit switching connection, data communication between the caller and the call receiver is free from influence of other data communications. That is, the communication delay, which means the time which is required to deliver data from a sender to a receiver, can be made substantially constant, and thus it is easy to assure a transfer rate. With this feature, the circuit switching connection is suitable for occasions of transmitting large-size content data to the same receiver, such as multimedia phones and moving picture distribution.

In the packet switching connection, a communication path is not occupied by one call but is shared with other calls, which is contrary to the circuit switching connection. On the shared communication path, data is divided into packets and is transmitted together with other packets for other call exchanges. The packet switching connection therefore permits an effective use of communication path resources which resultantly provides a reduction in the communication cost. However, the packet switching connection experiences and/or causes problems such as the loss of packets and the reversal of the order of arrival of the packets, and thus, the packet switching connection fails to achieve a constant communication delay in contrast to the circuit switching connection. That is, in the packet exchanging connection, it is not easy to assure a transfer rate. Moreover, since packets for one call exchange must be distinguished from the packets for other call exchanges, each packet includes identifiers representing the sender and the receiver in addition to the data to be transmitted. The effective transfer rate is therefore lower in the packet switching connection than in the circuit switching connection. The effective transfer rate as used herein refers to the transfer rate for data only, excluding control information such as identifiers. In view of the above, the packet switching connection is suitable for occasions where a communication delay does not cause a significant problem or where data communication is not always active throughout the call period, such as for the exchange of emails.

Conventionally, the content retrieval devices used only either one of the circuit switching connection and the packet switching connection. Recently, there has been developed a content retrieval device that can selectively use either the circuit switching connection or the packet switching connection. An example of such a content retrieval device is an inter-LAN connection device disclosed in Japanese Patent Gazette No. 2625388. The inter-LAN connection device is applied to systems which execute data communication via ISDN (Integrated Services Digital Network). The inter-LAN connection device monitors the data transfer amount on a communication path, and selects either the circuit switching connection or the packet switching connection based on the data transfer amount and the communication traffic amount, which means the communication density of data on a communication path, for each transaction.

The inter-LAN connection device monitors data communication actually executed and selects either the circuit switching connection or the packet switching connection based on the status of the monitored data communication. Therefore, it is difficult for the inter-LAN device to select the particular connection method which is suitable for incoming or arriving data communication. The inter-LAN connection device has another problem as follows. The connection method may be switched depending on the status of the data communication. In such an event, a communication delay is caused by the time which is required to complete the switching from one connection method to the other when a continuous data communication without interruption is required such as when a moving picture file is transmitted, for example. In view of the above, the inter-LAN connection device is not suitable for data having a nature such that a communication delay and interruption of data communication are fatal.

To solve the above-described problems, the inter-LAN connection device is provided with a transaction information setting section that sets an attribute of the data which is exchanged for each transaction as transaction information. By referring to the transaction information setting section, incoming data to be exchanged is predicted and a suitable connection method for the data is selected. However, on the Internet, various types of data such as text files, moving picture files, and audio files are available. Therefore, it is difficult for the inter-LAN connection device to correctly predict incoming data to be exchanged.

SUMMARY OF THE INVENTION

Therefore, an object of the present invention is to provide a content retrieval device which selects a suitable connection method prior to data reception.

The present invention has the following features to solve the above-described problems.

One aspect of the present invention is directed to a content retrieval device having a multi-call function which allows a plurality of connection methods to be used for retrieving content data from a server via a communication network under an optimum connection method. The content retrieval device includes: a browser section for generating a retrieval request specifying locational information of content data to be retrieved presently; a protocol control section for determining a connection method for the content data which is specified by the browser section prior to reception of the content data; and a communication control section for receiving the content data which is specified by the browser section from the server under the connection method as determined by the protocol control section.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram of a mobile communication unit Ucomm1 to Ucomm4.

FIG. 5 is a flowchart of the operation of the mobile communication unit Ucomm1.

FIGS. 7A and 7B are diagrams of a connection information table Tconn2 and an internal information table Tctyp, respectively.

FIG. 8 is a flowchart of the operation of the mobile communication unit Ucomm2.

FIG. 10 is a diagram of a connection information table Tconn3.

DETAILED DESCRIPTION OF THE INVENTION

First Embodiment

Figure 1:
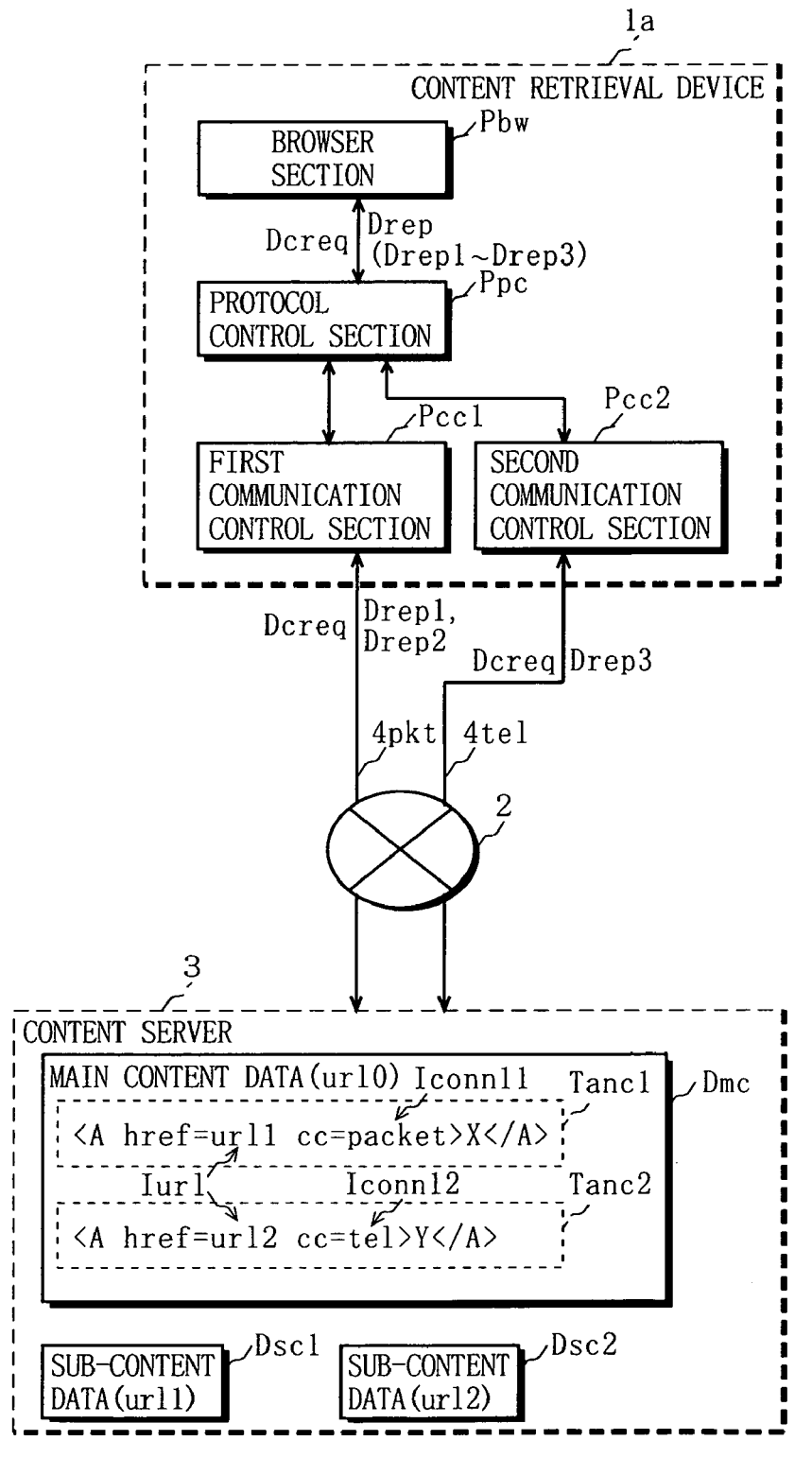
FIG. 1 is a functional block diagram of a content retrieval device 1a according to a first embodiment of the present invention.

FIG. 1 is a functional block diagram of a content retrieval device 1a according to a first embodiment of the present invention. FIG. 1 also shows a communication network 2 and a content server 3 in association with the content retrieval device 1a. The content retrieval device 1a has a multi-call function which permits the retrieval of content data Dc from the content server 3 by either one of the packet switching connection method or the circuit switching connection method. The content retrieval device 1a accesses the content server 3 via a first communication path 4pkt during the packet switching connection, while the content retrieval device 1a accesses the content server 3 via a second communication path 4tel during the circuit switching connection. To realize the data communication described above, the content retrieval device 1a includes a browser section Pbw, a protocol control section Ppc, a first communication control section Pcc1, and a second communication control section Pcc2.

The content server 3 stores some content data Dc, each of which is typically a text file described in a markup language typified by Hypertext Markup Language (HTML), an audio file, a still picture file, or a moving picture file. HTML permits linking of one content data Dc to another content data Dc (a so-called hyperlink). In the first embodiment, the content data Dc in which a link originates is hereinafter referred to as main content data Dmc, and the content data Dc as a linked target is hereinafter referred to as sub-content data Dsc.

To achieve a hyperlink, the main content data Dmc includes an anchor tag Tanc that specifies locational information Iurl (that is, URL (uniform resource locator), specified as url1 or url2 in FIG. 1) indicating the storage location of the sub-content data Dsc. In the first embodiment, the anchor tag Tanc also includes connection method information Iconn1 (connection method information Iconn11 or Iconn12 is illustrated in FIG. 1) as an attribute value. The connection method information Iconn1 indicates a suitable connection method under which the content retrieval device 1a suitably retrieves the sub-content data Dsc. In the first embodiment, two types of connection method information Iconn1 are defined: the connection method information Iconn11 indicating that the suitable connection method is the packet switching connection, described as cc=packet; and the connection method information Iconn12 indicating that the suitable connection method is the circuit switching connection, described as cc=tel.

FIG. 1 exemplifies one main content data Dmc, and FIG. 1 exemplifies two sub-content data Dsc1 and Dsc2 as the sub-content data Dsc. As the locational information Iurl of the main content data Dmc, url0 is allocated, which has a form like http://www.xxx.co.jp/main.html. Assume that the sub-content data Dsc1 is a text file or a still picture file to which a communication delay and an interruption of data communication are not fatal, that is, a file which is suitable to be retrieved under the packet switching connection method. On the other hand, assume that the sub-content data Dsc2 is an audio file or a moving picture file to which a communication delay and an interruption of data transfer are fatal, that is, a file suitable to be retrieved under the circuit switching connection method. Assume also that the loational information Iurl of the sub-content data Dsc1 is url1 and that the loational information Iurl1 of the sub-content data Dsc2 is url2. Under the above assumptions, the main content data Dmc has descriptions of two anchor tags Tanc1 and Tanc2. The anchor tag Tanc1 includes descriptions of "href=url1" and "cc=packet", while the anchor tag Tanc2 includes descriptions of "href=url2" and "cc=tel".

Hereinafter, the operation of the content retrieval device 1a will be described. The protocol control section Ppc receives a content retrieval request Dcreq from the browser section Pbw. Assume that the present content retrieval request Dcreq is generated in response to an input by the user of the content retrieval device 1a and includes the locational information Iurl of the main content data Dmc (that is, url0). The protocol control section Ppc passes the received retrieval request Dcreq to the first communication control section Pcc1, thereby instructing the first communication control section Pcc1 to retrieve the main content data Dmc. In response to this instruction, the first communication control section Pcc1 first establishes the first communication path 4*pkt* to the content server 3 according to the packet switching connection requirements if the connection has not already been established, and then transmits the retrieval request Dcreq to the content server 3.

The first communication path 4*pkt* is used for retrieval of the main content data Dmc as described above. This is because, since the main content data Dmc is a file in which a link originates, the connection method which is suitable for retrieving the main content data Dmc is not specified in the anchor tag Tanc. In addition, the communication cost is generally lower in the packet switching connection method than in the circuit switching connection method since many users share the first communication path 4*pkt*.

Figures 2A, 2B:
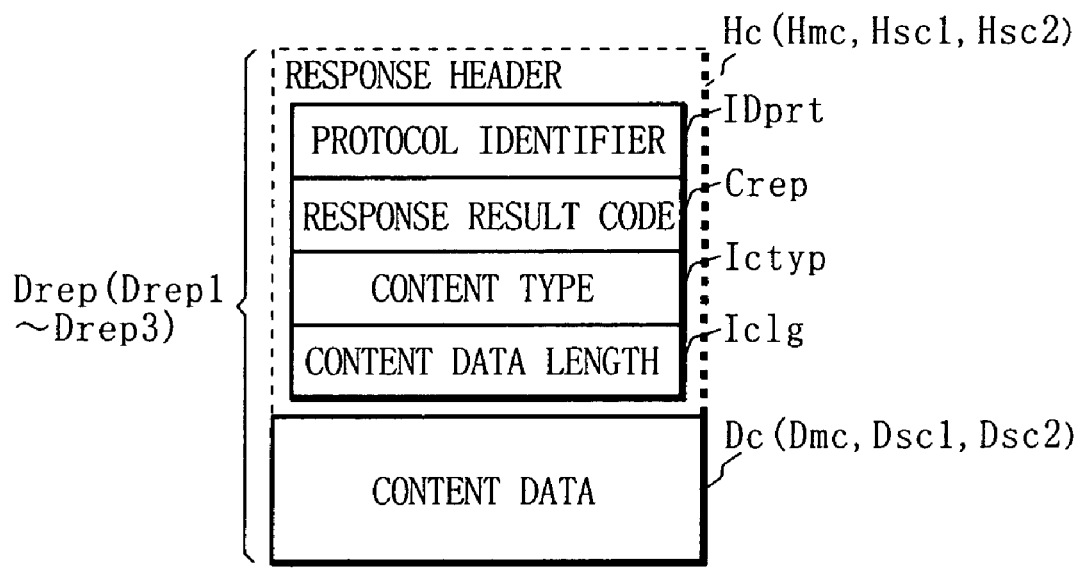
FIGS. 2A and 2B are diagrams of the data structure of response data Drep which is generated by a content server 3 in FIG. 1 and an internal information table Tconn1, respectively.

The content server 3 reads the content data Dc based on the locational information Iurl in the received retrieval request Dcreq, and generates a response header Hc and response data Drep. The content data Dc read presently is main content data Dmc. The response header Hc generated presently is a response header Hmc for the main content data Dmc which includes a protocol identifier IDprt, a response result code Crep, a content type Ictyp, and a content data length Iclg, as shown in FIG. 2A. The protocol identifier IDprt specifies the protocol for the present data communication. The response result code Crep specifies the response result to the present retrieval request Dcreq. The content type Ictyp indicates the type of the presently read content data Dmc. Here, assume that the present content type Ictyp indicates that the content data Dmc is described in HTML. The content data length Iclg indicates the size of the presently read content data Dmc. The response data Drep prepared presently is response data Drep1 for the main content data Dmc. The response data Drep1, which includes the main content data Dmc and the above-described response header Hmc that is added to the main content data Dmc, is transmitted to the content retrieval device 1*a* via the first communication path 4*pkt*.

In the content retrieval device 1*a*, the first communication control section Pcc1 receives the response data Drep1 via the first communication path 4*pkt* and passes the response data Drep1 to the protocol control section Ppc in its current form. The protocol control section Ppc identifies the type of the content data Dc from the preceding content type Ictyp in the received response data Drep1. If the content type Ictyp indicates HTML, the protocol control section Ppc passes the received response data Drep1 to a language analysis portion (not shown) of the browser section Pbw, thereby instructing the browser section Pbw to analyze the main content data Dmc in the response data Drep1.

In response to the instruction, the browser section Pbw analyzes the structure and arrangement of the text which is represented by the content data Dmc, and then performs display processing for the text. In addition, the browser section Pbw extracts, as internal information, a set of the locational information Iurl and the connection method information Iconn1 from each of the anchor tags Tanc1 and Tanc2. Further, the browser section Pbw describes the extracted information in an internal information table Tconn1 held therein. As shown in FIG. 2B, the internal information table Tconn1 is constructed so as to allow for a description of sets of the locational information Iurl and the connection method information Iconn1 therein. With this information table Tconn1, it is possible to indicate which connection method, i.e., the packet switching connection method or the circuit switching connection method, is suitable for the retrieval of the sub-content data Dsc. In the first embodiment, the anchor tag Tanc1 includes the set of "href=url1" and "cc=Packet" as the connection method information Iconn11, and the anchor tag Tanc2 includes the set of "href=url2" and "cc=tel" as the connection method information Iconn12, as shown in FIG. 1. Therefore, described in the internal information table Tconn1 are the set of url1 and packet and the set of url2 and tel as shown in FIG. 2B. Thus, it is indicated that the packet switching connection is suitable for the retrieval of the sub-content data Dsc1, while the circuit switching connection is suitable for the retrieval of the sub-content data Dsc2.

Figure 3A:
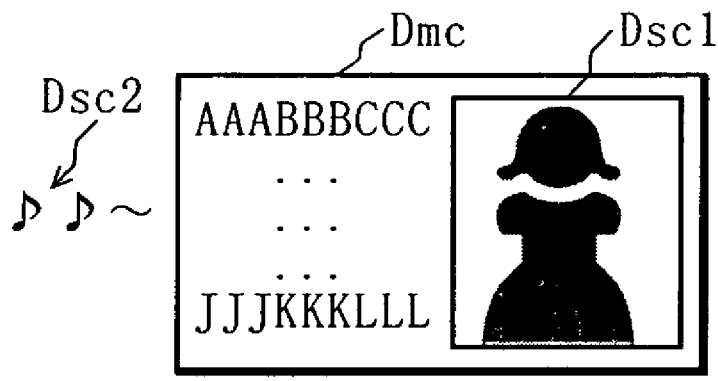
FIGS. 3A and 3B are diagrams showing the relationship between main content data Dmc and sub-content data Dsc.

When the sub-content data Dsc1 is to be retrieved, the protocol control section Ppc receives a retrieval request Dcreq including the locational information Iurl. This retrieval request Dcreq is automatically generated by the browser section Pbw. The retrieval request Dcreq is automatically generated when the sub-content data Dsc1 is embedded in the main content data Dmc. An example of this embedded data is shown in FIG. 3A, where a still picture which is represented by the sub-content data Dsc1 is pasted to text which is represented by the main content data Dmc. The protocol control section Ppc extracts the locational information Iurl from the received retrieval request Dcreq, and extracts the connection method information Iconn1 pairing with (corresponding to) this locational information Iurl (the connection method information Iconn11 in this case) from the internal information table Tconn1 (see FIG. 2B). The protocol control section Ppc determines which connection method, i.e., the packet switching connection or the circuit switching connection, should be adopted for the present sub-content data Dsc according to the extracted connection method information Iconn1. Since the connection method information Iconn11 has been extracted in this case, the packet switching connection method is determined to be suitable.

Based on the above determination, the protocol control section Ppc passes the received retrieval request Dcreq to the first communication control section Pcc1, thereby instructing the first communication control section Pcc1 to retrieve the sub-content data Dsc1. In response to this instruction, the first communication control section Pcc1 transmits the present retrieval request Dcreq to the content server 3 via the first communication path 4*pkt* if the first communication path 4*pkt* has been established. If the first communication path 4*pkf* has not been established, the first communication control section Pcc1 first establishes the first communication path 4*pkt* to the content server 3 and then transmits thereto the present retrieval request Dcreq to the content server via the established first communication path 4*pkt*.

Based on the locational information Iurl which is specified in the received retrieval request Dcreq, the content server 3 reads the content data Dc, and generates a response header Hc and response data Drep. The content data Dc read presently is sub-content data Dsc1. The content server 3 generates a response header Hsc1 for the sub-content data Dsc1. The response header Hsc1 is constructed as shown in FIG. 2A, where the content type Ictyp and the content data length Iclg respectively indicate the type and size of the presently read sub-content data Dsc1. In the first embodiment, the type of the sub-content data Dsc1 is a still picture as shown in FIG. 3A, and thus, the type of content data which is specified by the content type Ictyp is a still picture. The content server 3 generates response data Drep2 by adding the response header Hsc1 to the sub-content data Dsc1, and sends the response data Drep2 to the first communication path 4*pkt*.

The first communication control section Pcc1 of the content retrieval device 1*a* receives the response data Drep2 from the first communication path 4*pkt* and passes the response data Drep2 to the protocol control section Ppc in its current form. The protocol control section Ppc identifies the type of the content data Dsc1 from the preceding content type Ictyp in the received response data Drep2. Once the protocol control section Ppc determines that the content type Ictyp indicates a still picture, the protocol control section Ppc passes the received response data Drep2 to a still picture display processing portion (not shown) of the browser section Pbw, thereby instructing the browser section Pbw to carry out processing for displaying the sub-content data Dsc1 in the response data Drep2. In response to the instruction, the browser section Pbw performs still picture display processing of the sub-content data Dsc1. As a result, the browser section Pbw pastes the still picture which is represented by the sub-content data Dsc1 to the text which is represented by the main content data Dmc.

Next, retrieval of the sub-content data Dsc2 will be described. Assume that the sub-content data Dsc2 is an audio file and is embedded in the main content data Dmc. More specifically, as shown in FIG. 3A, the audio which is represented by the sub-content data Dsc2 is played during the display of the text which is represented by the main content data Dmc. Upon the retrieval of the sub-content data Dsc2, the protocol control section Ppc receives a retrieval request Dcreq including the locational information Iurl (that is, url2) from the browser section Pbw. The protocol control section Ppc extracts the locational information Iurl from the received retrieval request Dcreq, and then extracts the connection method information Iconn1 pairing with this locational information Iurl (the connection method information Iconn12 in this case) from the internal information table Tconn1. The protocol control section Ppc determines the connection method to be adopted presently (i.e., the circuit switching connection in this case) according to the extracted connection method information Iconn1.

Based on the above determination, the protocol control section Ppc passes the received retrieval request Dcreq to the second communication control section Pcc2, thereby instructing the second communication control section Pcc2 to retrieve the sub-content data Dsc2. In response to this instruction, the second communication control section Pcc2 transmits the present retrieval request Dcreq to the content server 3 via the second communication path 4*tel* if the second communication path 4*tel* has been established. If the second communication path 4*tel* has not been established, the second communication control section Pcc2 first establishes the second communication path 4*tel* to the content server 3 and then transmits the present retrieval request Dcreq to the content server 3 via the established second communication path 4*tel*.

Based on the locational information Iurl which is specified in the received retrieval request Dcreq, the content server 3 reads the sub-content data Dsc2, and also generates a response header Hsc2 (see FIG. 2A) for the present sub-content data Dsc2. The content server 3 generates response data Drep3 by adding the response header Hsc2 to the sub-content data Dsc2, and sends the response data Drep3 to the second communication path 4*tel*.

The second communication control section Pcc2 of the content retrieval device 1*a* receives the response data Drep3 from the second communication path 4*tel*, and passes the response data Drep3 to the protocol control section Ppc in its current form. The protocol control section Ppc identifies the type of the sub-content data Dsc2 from the content type Ictyp in the received response data Drep3. Once the protocol control section Ppc determines that the content type Ictyp indicates an audio file, the protocol control section Ppc passes the received response data Drep3 to an audio replay processing portion (not shown) of the browser section Pbw, thereby instructing the browser section Pbw to replay audio which is represented by the sub-content data Dsc2. In response to the instruction, the browser section Pbw performs replay processing. As a result, an output section (not shown) outputs the audio together with the screen display as shown in FIG. 3A.

As described above, the main content data Dmc includes the connection method information Iconn11 and Iconn12 which is suitable for the retrieval of the sub-content data Dsc1 and Dsc2. Therefore, by analyzing the main content data Dmc, the content retrieval device 1*a* is informed of the connection methods which are suitable for retrieving the sub-content data Dsc1 and Dsc2 prior to the retrieval of the sub-content data Dsc1 and Dsc2. In other words, the content retrieval device 1*a* can select the circuit switching connection prior to retrieval of the sub-content data Dsc2, and thus, the content retrieval device 1*a* can retrieve an audio file or a moving picture file without any communication delay or an interruption of data communication. Likewise, the content retrieval device 1*a* can select the packet switching connection prior to the retrieval of the sub-content data Dsc1, and thus, the content retrieval device 1*a* can retrieve a file such as an email that does not require consideration to a communication delay and interruption of data communication at a relatively low communication cost.

In the first embodiment, the suitable connection method is specified by the attribute value in the anchor tag Tanc. Alternatively, a new anchor tag may be defined separately from the normal anchor tag Tanc so as to specify the suitable connection method.

Figure 3B:
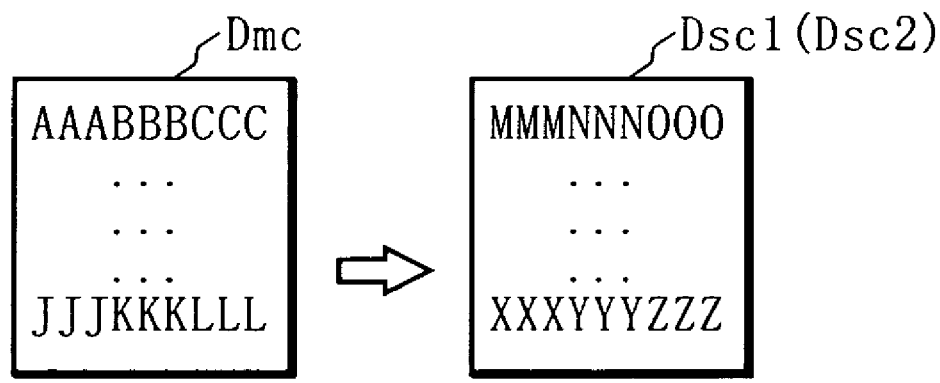

In the above-described first embodiment, the sub-content data Dsc1 and Dsc2 are embedded in the main content data Dmc (see FIG. 3A). Alternatively, the sub-content data Dsc1 and Dsc2 may be linked to the main content data Dmc while representing contents which are independent of the main content data Dmc. More specifically, as shown in FIG. 3B, the contents which are represented by the main content data Dmc are first displayed. Once the user designates the anchor tag Tanc1 or Tanc2 in the context of the displayed contents, the content retrieval device 1*a* retrieves the sub-content data Dsc1 or Dsc2. As a result, the displayed contents are switched to the contents which are represented by the sub-content data Dsc1 or Dsc2.

An example of the implementation of the content retrieval device 1*a* of the first embodiment as described above will now be described. FIG. 4 is a block diagram of a mobile communication unit Ucomm1 incorporating the content retrieval device 1*a*. Referring to FIG. 4, the mobile communication unit Ucomm1 includes a CPU 11, a ROM 12, a RAM 13, the first communication control section Pcc1, the second communication control section Pcc2, an input device 14, an output device 15, a multiplexer/demultiplexer 16, and a transmitter/receiver 17. The CPU 11 executes a program which is stored in advance in the ROM 12. During execution of the program stored in the ROM 12, the CPU 11 uses the RAM 13 as a working area. The CPU 11, in combination with the ROM 12 and the RAM 13, constitutes the browser section Pbw and the protocol control section Ppc (see FIG. 1) described above. The first communication control section Pcc1 performs data communication under the packet switching connection method under the control of the CPU 11. Likewise, the second communication control section Pcc2 performs data communication under the circuit switching connection method under the control of the CPU 11. The CPU 11, the ROM 12, the RAM 13, the first communication control section Pcc1, and the second communication control section Pcc2 constitute the content retrieval device 1a.

The input device 14 typically includes keys, buttons, and a jog dial which are operated by the user. The output device 15, which includes a liquid crystal display and a speaker, performs output processing for output data Dout that is generated by the CPU 11, and presents the contents which are represented by the output data Dout to the user. The multiplexer/demultiplexer 16 multiplexes the retrieval request Dcreq which is received from the first communication control section Pcc1 and the second communication control section Pcc2, and also demultiplexes the content data Dc which is received from the transmitter/receiver 17. More specifically, since content data Dc that are directed to other mobile communication units Ucomm1 are also sent from the transmitter/receiver 17, the multiplexer/demultiplexer 16 demultiplexes the content data Dc directed to itself from the content data Dc that are directed to other units. The transmitter/receiver 17 sends the retrieval request Dcreq which is multiplexed by the multiplexer/demultiplexer 16 to the communication network 2. In addition, the transmitter/receiver 17 receives the content data Dc which is transmitted via the communication network 2 and passes the data to the multiplexer/demultiplexer 16.

The operation of the mobile communication unit Ucomm1 will be described with reference to the flowchart of FIG. 5. The CPU 11 executes a program stored in the ROM 12. The user inputs locational information Iurl of content data Dc that he or she desires to retrieve at the present time through the input device 14. Assume that the locational information which is input presently is the locational information Iurl of the main content data Dmc (that is, url0). The CPU 11 first operates as the browser section Pbw so as to generate a retrieval request (step S101). More specifically, at step S101, the CPU 11 generates a retrieval request Dcreq including the locational information Iurl which is sent from the input device 14.

The CPU 11 then operates as the protocol control section Ppc so as to determine whether or not the connection has been established (step S102). More specifically, at step S102, the CPU 11 determines whether or not access to the content server 3 (see FIG. 1) is possible under either the packet switching connection or the circuit switching connection methods. If the connection has not been established, the CPU 11 passes the present retrieval request Dcreq to the first communication control section Pcc1, thereby instructing the first communication control section Pcc1 to retrieve the main content data Dmc (step S103). The above series of processing until step S103 are those operations which are executed by the protocol control section Ppc.

In response to the instruction from the CPU 11, the first communication control section Pcc1 establishes the first communication path 4pkt to the content server 3 (step S104). Once the first communication path 4pkt has been established, the first communication control section Pcc1 passes the retrieval request Dcreq to the multiplexer/demultiplexer 16. The multiplexer/demultiplexer 16 then multiplexes the received retrieval request Dcreq and passes the multiplexed retrieval request Dcreq to the transmitter/receiver 17, which sends the multiplexed retrieval request Dcreq to the first communication path 4pkt. In this way, the presently generated retrieval request Dcreq is sent to the first communication path 4pkt (step S105). The content server 3 receives the retrieval request Dcreq, and in response to the received retrieval request Dcreq, the content server 3 generates response data Drep1 (see FIG. 2A), which is sent to the first communication path 4pkt.

In the mobile communication unit Ucomm1, the transmitter/receiver 17 receives the response data Drep1 from the first communication path 4pkt and passes the data to the multiplexer/demultiplexer 16. The multiplexer/demultiplexer 16 demultiplexes the response data Drep1 which is directed to itself from those directed to other units, and passes the data to the first communication control section Pcc1. The first communication control section Pcc1 passes and stores the received response data Drep1 in its current form to the RAM 13. In this way, the response data Drep1 is received by the mobile communication unit Ucomm1 (step S106). Once the response data Drep1 is stored in the RAM 13, the CPU 11 operates as the protocol control section Ppc so as to determine the type of the main content data Dmc from the preceding content type Ictyp in the received response data Drep1 (step S107). More specifically, the CPU 11 determines whether or not the main content data Dmc is described in HTML. In this case, the content type Ictyp in the response data Drep1 indicates HTML. Therefore, the CPU 11 proceeds to step S108.

The CPU 11 then operates as the browser section Pbw so as to analyze the main content data Dmc and to extract sets of the locational information Iurl and the connection method information Iconn1 from the anchor tags Tanc1 and Tanc2 as internal information. The CPU 11 describes the extracted sets of the locational information Iurl and the connection method information Iconn1 in the internal information table Tconn1. In this way, the internal information table Tconn1 is created (step S108). The CPU 11 also analyzes the structure and arrangement of the text which is represented by the main content data Dmc, and generates output data Dout in the RAM 13 (step S109). The output data Dout is transferred to the output device 15, which performs display processing according to the output data Dout.

When the sub-content data Dsc1 or Dsc2 is to be retrieved by the mobile communication unit Ucomm1, the CPU 11 generates a content retrieval request Dcreq (step S101). This time, the retrieval request Dcreq is automatically generated by the CPU 11, and includes the locational information Iurl (that is, url1 or url2). The CPU 11 determines whether or not the connection has been established (step S102). This time, the first communication path 4pkt is available for data communication. The CPU 11 therefore determines that the connection has been established. The CPU 11 then determines whether or not the content data Dc to be retrieved presently is sub-content data Dsc (step S1010). More specifically, the CPU 11 determines whether or not the connection method information Iconn1 corresponding to pairing with the locational information Iurl in the presently prepared retrieval request Dcreq is found in the internal information table Tconn1 (see FIG. 2B) that is created at step S108.

If the connection method information Iconn1 is not found in the internal information table Tconn1, the content data Dc to be retrieved presently must be main content data Dmc. The CPU 11 therefore proceeds to step S105 so as to execute the subsequent process steps. If the connection method information Iconn1 is found in the internal information table Tconn1, the content data Dc to be retrieved presently is considered to be sub-content data Dsc. The CPU 11 then extracts the connection method information Iconn1 (the connection method information Iconn11 or Iconn12) corresponding to pairing with the locational information Iurl from the internal information table Tconn1 (step S1011). Thereafter, the CPU 11 determines whether or not the extracted connection method information Iconn1 indicates the second communication path 4tel (step S1012).

If the present retrieval request Dcreq includes url1 as the locational information Iurl, the connection method information Iconn11 has been extracted at step S1011. In this case, the CPU 11 determines that the extracted connection method information Iconn1 does not indicate the second communication path 4*tel*. That is, the CPU 11 determines that the sub-content data Dsc1 is to be retrieved through the first communication path 4*pkt* as in the main content data Dmc.

If the present retrieval request Dcreq includes url2 as the locational information Iurl, the connection method information Iconn12 has been extracted at step S1011. In this case, the CPU 11 determines that the extracted connection method information Iconn1 indicates the second communication path 4*tel*. That is, the CPU 11 determines that the sub-content data Dsc2 is to be retrieved under the circuit switching connection method. The CPU 11 then proceeds to step S1013, and first instructs the first communication control section Pcc1 to cut the connection (i.e., disconnect the first communication path 4*pkt*). The CPU 11 then passes the presently generated retrieval request Dcreq to the second communication control section Pcc2, thereby instructing the second communication control section Pcc2 to retrieve the sub-content data Dsc2 (step S1013). The above series of processing from steps S1010 through S1013 are also the operations which are executed by the protocol control section Ppc.

In response to the instruction from the CPU 11, the first communication control section Pcc1 disconnects the first communication path 4*pkt* that has been established as the path to the content server 3. Also, in response to the instruction from the CPU 11, the second communication control section Pcc2 establishes the second communication path 4*tel* to the content server 3 according to the circuit switching connection requirements (step S1014). Once the second communication path 4*tel* has been established, the second communication control section Pcc2 passes the retrieval request Dcreq to the multiplexer/demultiplexer 16. The multiplexer/demultiplexer 16 then multiplexes the received retrieval request Dcreq and passes the multiplexed retrieval request Dreq to the transmitter/receiver 17, which sends the multiplexed retrieval request Dcreq to the second communication path 4*tel*. In this way, the presently generated retrieval request Dcreq is sent to the second communication path 4*tel* (step S105). As a result, the sub-content data Dsc2 is retrieved via the second communication path 4*tel*, unlike the main content data Dmc.

As described above with reference to FIG. 3A, the sub-content data Dsc1 and Dsc2 represent still picture and audio, and thus are not described in HTML in the strict sense. Therefore, principally, the determination by the CPU 11 at step S107 is NO. In this case, the CPU 11 skips the step of extracting internal information from the sub-content data Dsc1 and Dsc2. The CPU 11 then generates the output data Dout based on the sub-content data Dsc1 and Dsc2 and transfers the output data Dout to the output device 15 (step S109). The output device 15 performs still picture display processing and audio replay processing according to the received sub-content data Dsc1 and Dsc2.

Second Embodiment

Figure 6:
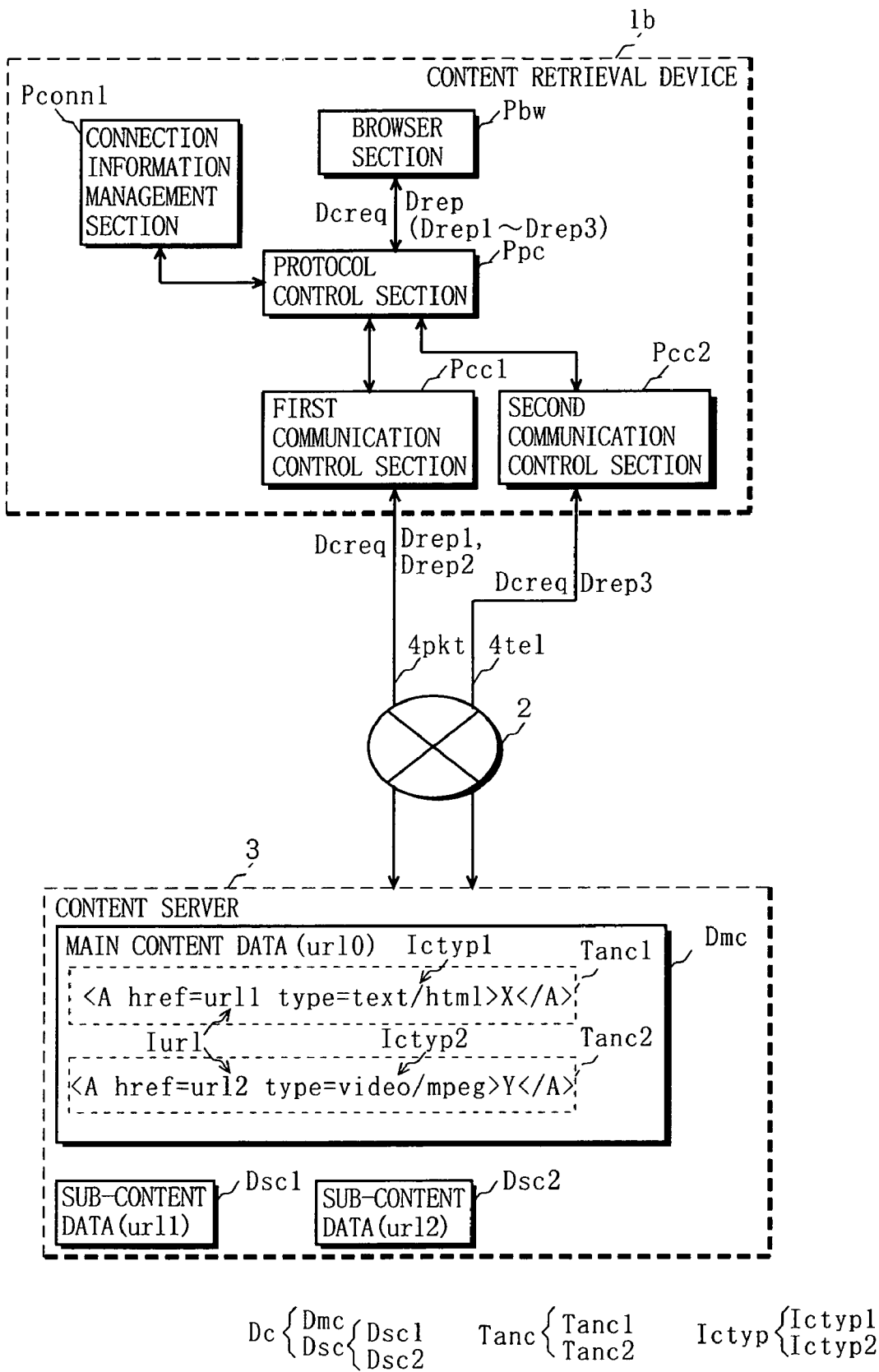
FIG. 6 is a functional block diagram of a content retrieval device 1b according to a second embodiment of the present invention.

FIG. 6 is a functional block diagram of a content retrieval device 1*b* according to a second embodiment of the present invention. FIG. 6 also shows a communication network 2 and a content server 3 in association with the content retrieval device 1*b*. As the content retrieval device 1*a*, the content retrieval device 1*b* of the second embodiment has a multi-call function that permits access to the content server 3 via a first communication path 4*pkt* during the packet switching connection method and that permits access to the content server 3 via a second communication path 4*tel* during the circuit switching connection method. The content retrieval device 1*b* of the second embodiment is different from the content retrieval device 1*a* of the first embodiment in that a connection information management section Pconn1 is additionally provided so as to realize the data communication described above. Otherwise, the construction of the content retrieval device 1*b* is the same as the construction of the content retrieval device 1*a*. In FIG. 6, therefore, the same components as those in FIG. 1 are denoted by the same reference numerals.

The connection information management section Pconn1 holds in advance and manages a connection information table Tconn2 as shown in FIG. 7A. The connection information table Tconn2 includes in advance sets of the content type Ictyp and the connection method information Iconn1 that is the same as that in the first embodiment. The content type Ictyp indicates the type of each content data Dc. The connection information table Tconn2 therefore shows which connection method, i.e., the packet switching connection method or the circuit switching connection method, is suitable for each content type Ictyp of the content data Dc. In the second embodiment, the content type Ictyp of text/html is allocated to an HTML file, while the content type Ictyp of video/mpeg is allocated to a moving picture file. Since a communication delay and an interruption of data communication are not fatal to the HTML file, text/html preferably pairs with the connection method information Iconn11 (packet switching connection). Also, since a communication delay and an interruption are fatal to the moving picture file, video/mpeg preferably pairs with the connection method information Iconn12 (circuit switching connection).

The content server 3 stores some content data Dc as in the first embodiment. In the first embodiment, the suitable connection method itself (connection method information Iconn1) is described in the main content data Dmc as the attribute value of the anchor tag Tanc. In the second embodiment, however, as the attribute value of the anchor tag Tanc, the content type Ictyp indicating the type of the sub-content data Dsc is described. In the second embodiment, two content types Ictyp are prepared: content type Ictyp1 indicating that the sub-content data Dsc which is specified by the anchor tag Tanc is an HTML file, described as type=text/html, and content type Ictyp2 indicating that the sub-content data Dsc which is specified by the anchor tag Tanc is a moving picture file, described as type=video/html.

FIG. 6 exemplifies one main content data Dmc, and FIG. 6 exemplifies two sub-content data Dsc1 and Dsc2 as the sub-content data Dsc. The locational information Iurl of the main content data Dmc is url0. Assume that the sub-content data Dsc1 is an HTML file to which a communication delay and an interruption of data communication are not fatal and that the sub-content data Dsc2 is a moving picture file to which a communication delay and an interruption are fatal, as described above. Assume also that the locational information Iurl of the sub-content data Dsc1 and Dsc2 are url1 and url2, respectively. Under the above assumption, the main content data Dmc has descriptions of two anchor tags Tanc1 and Tanc2. The anchor tag Tanc1 includes descriptions of "href=url1" and "type=text/html", while the anchor tag Tanc2 includes descriptions of "href=url2" and "type=video/mpeg".

The operation of the content retrieval device 1*b* having the above-described construction will now be described. The content retrieval device 1b retrieves the main content data Dmc from the content server 3 in substantially the same manner as the content retrieval device 1a of the first embodiment. That is, the protocol control section Ppc passes the main content data Dmc to the browser section Pbw to thereby instruct the browser section Pbw to analyze the data. In response to this instruction, the browser section Pbw analyzes the structure and arrangement of the text which is represented by the content data Dmc so as to generate output data Dout representing the text. In addition, the browser section Pbw extracts sets of the locational information Iurl and the content type Ictyp from the anchor tags Tanc1 and Tanc2 of the presently received content data Dmc as internal information, and describes and holds the internal information in the internal information table Tctyp. As shown in FIG. 7B, the internal information table Tctyp is constructed in advance so as to allow for a description of sets of the locational information Iurl and the content type Ictyp therein, and as a result, the content type Ictyp of each sub-content data Dsc is identified from the internal information table Tctyp. In the illustrated example of FIG. 6, the anchor tag Tanc1 includes the set of "href=url1" and "type=text/html", and the anchor tag Tanc2 includes the set of "href=url2" and "type=video/mpeg". Therefore, described in the internal information table Tctyp are the set of url1 and text/html and the set of url2 and video/mpeg, as shown in FIG. 7B.

When the sub-content data Dsc1 is to be retrieved, the protocol control section Ppc receives a retrieval request Dcreq including url1 as the locational information Iurl from the browser section Pbw. The protocol control section Ppc extracts the locational information Iurl from the received retrieval request Dcreq, and extracts the content type Ictyp (text/html in this case) pairing with the present locational information Iurl from the internal information table Tctyp (see FIG. 7B) of the browser section Pbw. The protocol control section Ppc then determines which connection method, i.e., the packet switching connection method or the circuit switching connection method, should be adopted for the sub-content data Dsc to be retrieved presently. For this purpose, the protocol control section Ppc inquires of the connection information management section Pconn1 about whether or not the connection information table Tconn2 includes a content type matching with the content type Ictyp which is extracted from the internal information table Tctyp. If the connection information table Tconn2 includes a content type matching with the inquired content type Ictyp, the connection information management section Pconn1 returns the connection method information Iconn1 (connection method information Iconn11 (packet) in this case) pairing with the content type Ictyp in question to the protocol control section Ppc. The protocol control section Ppc determines which connection method, i.e., the packet switching connection method or the circuit switching connection method, should be adopted for the sub-content data Dsc1 to be retrieved presently according to the connection method information Iconn1 which is fetched from the connection information management section Pconn1. In this case, since the connection method information Iconn11 is fetched, the packet switching connection is determined to be suitable. The subsequent operation is substantially the same as that of the first embodiment, and thus the description thereof is omitted here.

When the sub-content data Dsc2 is to be retrieved, the protocol control section Ppc receives a retrieval request Dcreq including url2 as the locational information Iurl. From the received retrieval request Dcreq, the protocol control section Ppc extracts the content type Ictyp (video/mpeg in this case) pairing with the locational information Iurl from the internal information table Tctyp of the browser section Pbw. The protocol control section Ppc then inquires of the connection information management section Pconn1 about whether or not the connection information table Tconn2 includes a content type matching with the content type Ictyp which is extracted from the internal information table Tctyp. If the connection information table Tconn2 includes the matching content type, the connection information management section Pconn1 returns the connection method information Iconn1 (connection method information Iconn12 (tel) in this case) pairing with the content type Ictyp in question to the protocol control section Ppc. The protocol control section Ppc determines which connection method, i.e., the packet switching connection method or the circuit switching connection method, should be adopted for the sub-content data Dsc2 to be retrieved presently according to the connection method information Iconn1 which is fetched from the connection information management section Pconn1. In this case, since the connection method information Iconn12 is fetched, the circuit switching connection is determined to be suitable. The subsequent operation is substantially the same as that of the first embodiment, and thus the description thereof is omitted here.

As described above, the main content data Dmc includes the content type Ictyp of each of the sub-content data Dsc1 and Dsc2. Also, the content retrieval device 1b holds the connection information table Tconn2 in which sets of the content type Ictyp and the connection method information Iconn1 are described in advance. The content retrieval device 1b analyzes the main content data Dmc and describes sets of the locational information Iurl and the content type Ictyp in the internal information table Tctyp. By referring to the internal information table Tctyp and the connection information table Tconn2, the content retrieval device 1b is informed of the connection method which is suitable for retrieving the sub-content data Dsc prior to the retrieval of the sub-content data Dsc.

In the second embodiment, the content type Ictyp is described in the content data Dc, and the connection information management section Pconn1 managed the connection method information Iconn1 in association with the content type Ictyp. Alternatively, the connection method information Iconn1 may be managed in association with an attribute of the content data Dc if the attribute is described in the content data Dc. A typical example of the attribute of the content data Dc includes the file name, the file extension, and the content length Iclg. In particular, if the content length Iclg is described in the content data Dc and the connection information management section Pconn1 manages the connection method information Iconn1 in association with the content length Iclg, the connection method information Iconn1 to be fetched is determined by comparing the length Iclg of the content data Dc to be retrieved with the content length Iclg which is managed by the connection information management section Pconn1.

In the second embodiment, the content type Ictyp is described in the content data Dc. Alternatively, the content retrieval device 1b may retrieve part of the sub-content data Dsc in advance and analyze the part of the data so as to specify the data format (that is, the content type Ictyp) of the present content data Dsc. The content retrieval device 1b then fetches the connection method information Iconn1 based on the specified content type Ictyp.

Hereinafter, a mobile communication unit Ucomm2 incorporating the content retrieval device 1b of the second embodiment as described above will be described. The mobile communication unit Ucomm2 has substantially the same construction as the mobile communication unit Ucomm1. Therefore, FIG. 4 will be referred to in the following description. The operation of the mobile communication unit Ucomm2 will be described with reference to the flowchart of FIG. 8. The flowchart of FIG. 8 is the same as the flowchart of FIG. 5 except that steps S108, S1010, and S1011 are replaced with steps S201, S202, and S203. In FIG. 8, therefore, steps corresponding to the steps in FIG. 5 are denoted by the same reference numerals, and the description thereof is omitted here.

When the mobile communication unit Ucomm2 is to retrieve the content data Dc, the CPU 11 first reads a program from the ROM 12 to the RAM 13. The program in the second embodiment includes the connection information table Tconn2 shown in FIG. 7A in advance. The connection information table Tconn2 is read to the RAM 13 during the reading of the program. The mobile communication unit Ucomm2 executes steps S101 through S107 for retrieval of the main content data Dmc. Since the content type Ictyp of the response data Drep1 (see FIG. 2A) indicates HTML, the CPU 11 proceeds from step S107 to step S201, where the CPU 11 analyzes the main content data Dmc so as to extract the sets of the locational information Iurl and the connection method information Iconn1 from the anchor tags Tanc1 and Tanc2 as internal information. The CPU 11 stores the extracted internal information in the RAM 13 and describes the internal information table Tctyp shown in FIG. 7B (step S201). The CPU 11 then proceeds to step S109.

When the mobile communication unit Ucomm2 is to retrieve the sub-content data Dsc1 or Dsc2, the CPU 11 executes steps S101 and S102 and then proceeds to step S202, where the CPU 11 determines whether or not the content data Dc to be retrieved presently is sub-content data Dsc (step S202). More specifically, the CPU 11 determines whether or not the same locational information as the locational information Iurl which is included in the presently generated retrieval request Dcreq is found in the internal information table Tctyp (see FIG. 7B) described at step S201.

If the same locational information Iurl is not found in the internal information table Tctyp, the content data Dc to be retrieved presently is main content data Dmc. The CPU 11 therefore proceeds to step S105. If the same locational information Iurl is found in the internal information table Tctyp, the content data Dc to be retrieved presently is considered to be sub-content data Dsc. The CPU 11 then proceeds to step S203, where the CPU 11 extracts the content type Ictyp (text/html or video/mpeg) pairing with the extracted locational information Iurl from the internal information table Tctyp. Thereafter, the CPU 11 accesses the connection information table Tconn2 read in the RAM 13 together with the program so as to extract the connection method information Iconn1 (packet or tel) pairing with the extracted content type Ictyp. The CPU 11 then proceeds to step S1012. The subsequent processing is the same as that of the first embodiment, and thus the description thereof is omitted here.

Third Embodiment

Figure 9:
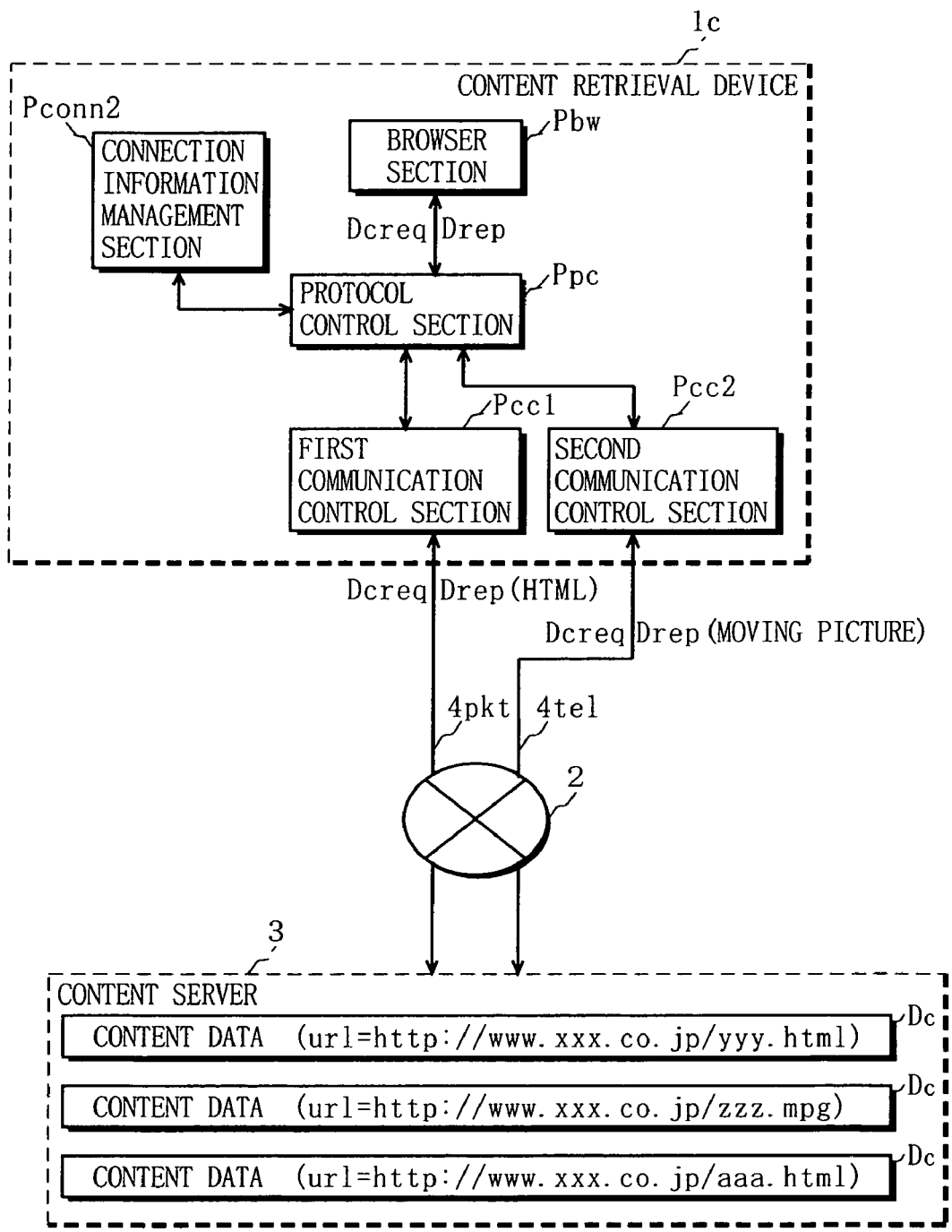
FIG. 9 is a functional block diagram of a content retrieval device 1c according to a third embodiment of the present invention.

FIG. 9 is a functional block diagram of a content retrieval device 1c according to a third embodiment of the present invention. FIG. 9 also shows a communication network 2 and a content server 3 in association with the content retrieval device 1c. As the content retrieval device 1a, the content retrieval device 1c of the third embodiment has a multi-call function that permits access to the content server 3 via a first communication path 4pkt during the packet switching connection method and that permits access to the content server 3 via a second communication path 4tel during the circuit switching connection method. The content retrieval device 1c of the third embodiment is different from the content retrieval device 1a of the first embodiment in that a connection information management section Pconn2 is additionally provided so as to realize the data communication described above. Otherwise, the construction of the content retrieval device 1c is the same as that of the content retrieval device 1a. In FIG. 9, therefore, the same components as those in FIG. 1 are denoted by the same reference numerals.

The connection information management section Pconn2 manages a connection information table Tconn3 shown in FIG. 10, which includes in advance sets of a part representing a feature of the locational information Iurl and the connection method information Iconn1 that is the same as that in the first embodiment. The locational information Iurl (that is, url) is uniquely allocated to each content data Dc and indicates the storage location of the content data Dc. Part of the locational information Iurl represents a feature of the content data Dc. More specifically, the locational information Iurl includes, as a suffix, an extension representing a feature of the content data Dc. Therefore, by referring to the set of the feature of the locational information Iurl and the connection method information Iconn1, it is identified which connection method, i.e., the packet switching connection method or the circuit switching connection method, is suitable for each feature (extension) of the locational information Iurl. In general, locational information Iurl having a form such as http://www.xxx.co.jp/yyy.html is allocated to an HTML file, where the extension is .html. A communication delay and an interruption of data communication are not fatal to the HTML file. Therefore, .html preferably pairs with the connection method information Iconn11 (packet switching connection). Likewise, locational information Iurl having a form such as http://www.xxx.co.jp/zzz.mpg is allocated to a moving picture file when the file is created according to an MPEG (Motion Picture Experts Group) file, where the extension is .mpg. A communication delay and an interruption are fatal to the moving picture file. Therefore, .mpg preferably pairs with the connection method information Iconn12 (circuit switching connection).

The content server 3 stores some content data Dc (three in the illustrated embodiment of FIG. 9) as in the first embodiment. The locational information Iurl described above is allocated to each content data Dc. In the first embodiment, the suitable connection method is itself described in the main content data Dmc as the attribute value of the anchor tag Tanc. In the third embodiment, however, the anchor tag Tanc has nothing to do with the nature of the content retrieval device 1c, and thus is not shown in the third embodiment.

The operation of the content retrieval device 1c having the above-described construction will now be described. The protocol control section Ppc receives a content retrieval request Dcreq including the locational information Iurl of the content data Dc. In response to the received retrieval request Dcreq, the protocol control section Ppc determines the connection method which is suitable for retrieval of the present content data Dc. Specifically, the protocol control section Ppc first extracts the feature, that is, the extension of the locational information Iurl from the received retrieval request Dcreq. The protocol control section Ppc then inquires of the connection information management section Pconn2 about whether or not the feature matching with the presently extracted feature of the locational information Iurl is found in the connection information table Tconn3. If the connection information table Tconn3 includes the feature matching with the inquired feature of the locational information Iurl, the connection information management section Pconn2 returns the connection method information Iconn1 pairing with this feature of the locational information Iurl to the protocol control section Ppc. The protocol control section Ppc determines which connection method, i.e., the packet switching connection method or the circuit switching connection method, should be adopted for the content data Dc to be retrieved presently according to the received connection method information Iconn1. The subsequent operation is substantially the same as that of the first embodiment, and thus the description thereof is omitted here.

As described above, each content data Dc has locational information Iurl allocated thereto which represents the feature of the content data Dc. The content retrieval device 1c holds in advance the connection information table Tconn3 including a description of the connection method information Iconn1 in association with the feature of the locational information Iurl. The content retrieval device 1c extracts the feature of the locational information Iurl from the retrieval request Dcreq, and, by using the extracted feature of the locational information Iurl and referring to the connection information table Tconn3, the content retrieval device 1c is informed of the connection method which is suitable for retrieving the content data Dc prior to retrieval of the content data Dc.

In the third embodiment, the connection method information Iconn1 is described in the connection information table Tconn3 in association with the extension and as a result, the protocol control section Ppc extracts the connection method information Iconn1 based on the extension of the locational information Iurl of the content data Dc to be retrieved. Alternatively, parts of the locational information Iurl other than the extension, such as the host name, part or all of the path, the scheme, or the port number may be described in the connection information table Tconn3. The protocol control section Ppc then extracts the connection method information corresponding to the information (the host name, part or all of the path, the scheme, or the port number) described in the connection information table Tconn3 by using the locational information Iurl of the content data Dc to be retrieved.

Hereinafter, a mobile communication unit Ucomm3 incorporating the content retrieval device 1c of the third embodiment as described above will be described. The mobile communication unit Ucomm3 has substantially the same construction as the mobile communication unit Ucomm1. Therefore, FIG. 4 will be referred to in the following description. The operation of the mobile communication unit Ucomm3 will be described with reference to the flowchart of FIG. 11.

When the mobile communication unit Ucomm3 is to retrieve the content data Dc, the CPU 11 first reads a program from the ROM 12 to the RAM 13. The program in the third embodiment includes the connection information table Tconn3 shown in FIG. 10 in advance. The connection information table Tconn3 is read to the RAM 13 during the reading of the program. When the content data Dc is to be retrieved by the mobile communication unit Ucomm3, the CPU 11 first operates as the browser section Pbw so as to generate a retrieval request (step S301). More specifically, at step S301, the CPU 11 generates a retrieval request Dcreq including the locational information Iurl which is received from the input device 14.

Thereafter, the CPU 11 operates as the protocol control section Ppc so as to extract an extension indicating the feature of the content data Dc to be retrieved presently from the presently extracted locational information Iurl (step S302). The CPU 11 then extracts the connection information Iconn1 pairing with the presently extracted feature of the locational information Iurl from the connection information table Tconn3 in the RAM 13 (step S303). The CPU 11 determines whether the present content data Dc should be retrieved under the packet switching connection method or the circuit switching connection method (step S304) according to the extracted connection method information Iconn1. If the extracted information is connection method information Iconn11, the packet switching connection method is determined to be suitable for the present retrieval of the content data Dc. If the extracted information is connection method information Iconn12, the circuit switching connection method is determined to be suitable for the present retrieval of the content data Dc.

Subsequently, the CPU 11 determines whether or not the connection to the content server 3 has been established (step S305). More specifically, the CPU 11 determines whether or not access to the server 3 (see FIG. 9) is possible under either the packet switching connection method or the circuit switching connection method. If the connection to the content server 3 has not been established, the CPU 11 passes the presently generated retrieval request Dcreq to either the first communication control section Pcc1 or the second communication control section Pcc2, thereby instructing either the first communication control section Pcc1 or the second communication control section Pcc2 to retrieve the content data Dc (step S306). At this step, if the packet switching connection method is determined to be suitable at step S304, the presently generated retrieval request Dcreq is passed to the first communication control section Pcc1. On the other hand, if the circuit switching connection method is determined to be suitable, the present retrieval request Dcreq is passed to the second communication control section Pcc2. The above series of processing until step S306 are those operations which are executed by the protocol control section Ppc.

The first or second communication control section Pcc1 or Pcc2 establishes the first or second communication path 4pkt or 4tel, respectively, to the content server 3 only when instructed to do so by the CPU 11 (step S307). Once the first or second communication path 4pkt or 4tel has been established, the first or second communication control section Pcc1 or Pcc2 passes the retrieval request Dcreq to the first or second communication path 4pkt or 4tel via the multiplexer/demultiplexer 16 and the transmitter/receiver 17. In this way, the retrieval request Dcreq is output to the first or second communication path 4pkt or 4tel (step S308). The content server 3 receives the retrieval request Dcreq, generates response data Drep1 as shown in FIG. 2A in response to the request, and sends the response to either the first or second communication path 4pkt or 4tel which has been currently established as the path to the mobile communication unit Ucomm3.

In the mobile communication unit Ucomm3, the first or second communication control section Pcc1 or Pcc2 receives the response data Drep directed to itself via the first or second communication path 4pkt or 4tel, the transmitter/receiver 17, and the multiplexer/demultiplexer 16. The first or second communication control section Pcc1 or Pcc2 stores the received response data Drep in the RAM 13 in its current form. In this way, the CPU 11 receives the response data Drep. In the subsequent step, the CPU 11 operates as the protocol control section Ppc so as to analyze the response data Drep in the RAM 13 (step S309). Thereafter, the CPU 11 operates as the browser section Pbw so as to generate output data Dout in the RAM 13 according to the content data Dc (step S310). The output data Dout is transferred to the output device 15 for output processing.

In some cases, the content retrieval device 1c of the third embodiment further generates a content retrieval request Dcreq after establishment of the connection with the content server 3. In such cases, the CPU 11 determines at step S305 that the connection has been established. The CPU 11 then determines whether or not switching of the connection is required (step S311). More specifically, the CPU 11 determines whether or not the communication path 4 (the first communication path 4pkt or the second communication path 4tel) which is presently used for data communication with the content server 3 matches with the communication path 4 determined at step S304. If the presently used communication path 4 matches the communication path determined at step S304, a new connection is not required to be established, and thus, the CPU 11 proceeds to step S307. If the communication path 4 determined at step S304 is different from the communication path 4 presently being used, the CPU 11 proceeds to step S312, where the CPU 11 first instructs the first or second communication control section Pcc1 or Pcc2 that is presently being used for data communication to cut the connection (disconnect the first or second communication path 4pkt or 4tel). The CPU 11 then passes the presently generated retrieval request Dcreq to the first or second communication control section Pcc1 or Pcc2 that has been determined at step S304, thereby instructing the determined first or second communication control section Pcc1 or Pcc2 to retrieve the content data Dc (step S312). Thereafter, the content retrieval device 1c executes step S308.

Fourth Embodiment

Figure 12:
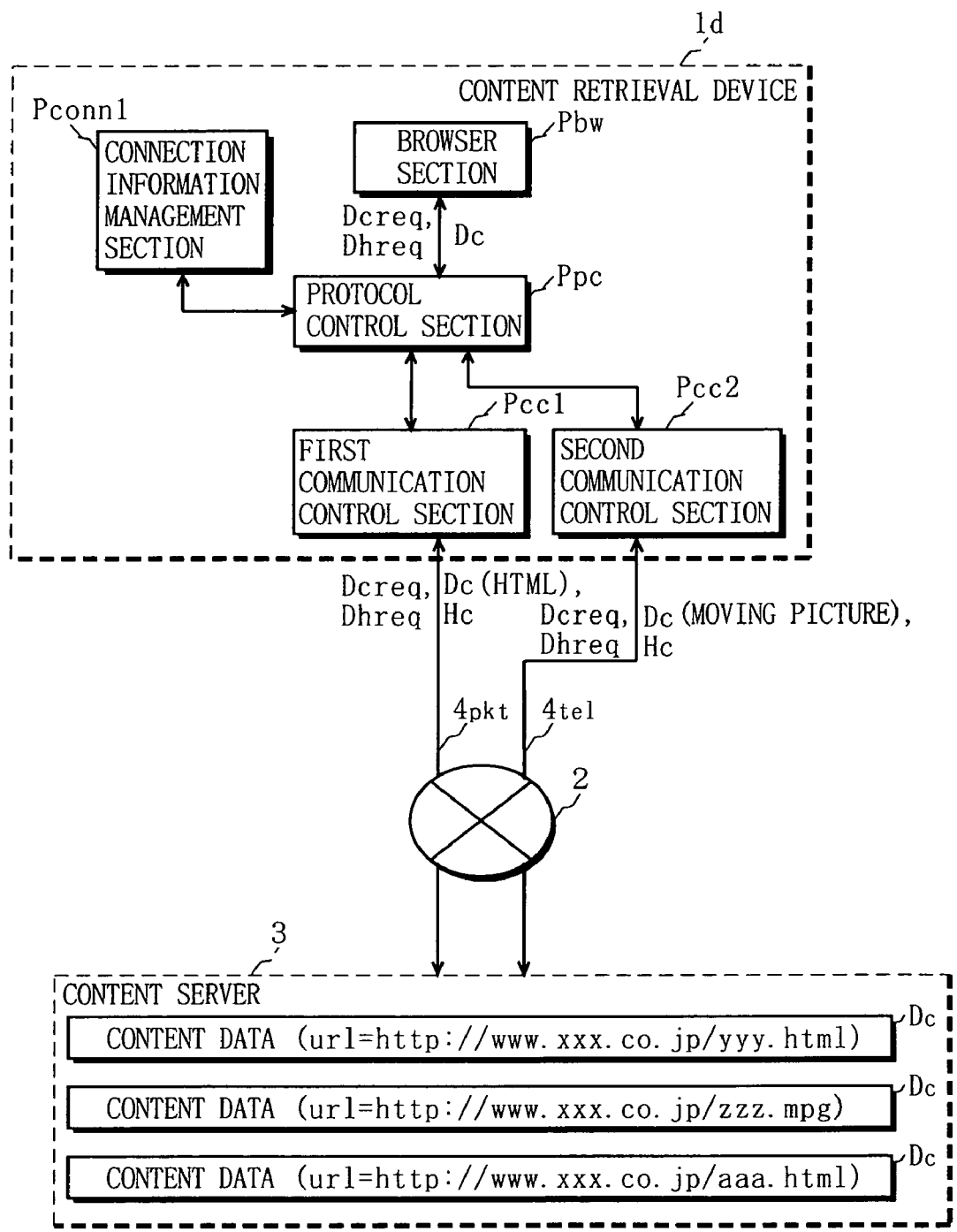
FIG. 12 is a functional block diagram of a content retrieval device 1d according to a fourth embodiment of the present invention.

FIG. 12 is a functional block diagram of a content retrieval device 1d according to a fourth embodiment of the present invention. FIG. 12 also shows a communication network 2 and a content server 3 in association with the content retrieval device 1d. The content retrieval device 1d of the fourth embodiment has the same construction as the content retrieval device 1b of the second embodiment, and thus the description thereof is omitted here. The content server 3 stores some content data Dc (three in the illustrated example) as in the third embodiment.

The operation of the content retrieval device 1d of the fourth embodiment having the above-described construction will now be described. The protocol control section Ppc receives a content retrieval request Dcreq which is generated by the browser section Pbw. The content retrieval request Dcreq includes the locational information Iurl of the content data Dc to be retrieved presently, as in the above-described embodiments. In response to the reception of the retrieval request Dcreq, the protocol control section Ppc generates a header retrieval request Dhreq, which is data requesting the content server 3 to transmit only a response header Hc for the content data Dc to be retrieved presently. The retrieval request Dhreq includes the locational information Iurl specifying the content data Dc. If data communication with the content server 3 has already been executed, the protocol control section Ppc passes the generated retrieval request Dhreq to the first or second communication control section Pcc1 or Pcc2 which is presently performing data communication, thereby instructing the first or second communication control section Pcc1 or Pcc2 to retrieve the response header Hc. The first or second communication control section Pcc1 or Pcc2 transmits the retrieval request Dhreq to the content server 3 via the first or second communication path 4pkt or 4tel only when instructed to do so by the protocol control section Ppc.

If data communication with the content server 3 has not already been executed, the protocol control section Ppc passes the generated retrieval request Dhreq preferably to the first communication control section Pcc1, thereby instructing the first communication control section Pcc1 to retrieve the response header Hc. The first communication control section Pcc1 is selected because the first communication path 4pkt is less expensive in communication cost. In response to the instruction from the protocol control section Ppc, the first communication control section Pcc1 transmits the retrieval request Dhreq to the content server 3 via the first transmission path 4pkt.

The content server 3 prepares the response header Hc for the content data Dc based on the locational information Iurl which is specified in the received retrieval request Dhreq. The format of the response header Hc is as shown in FIG. 2A. The prepared response header Hc is transmitted by the content server 3 to the content retrieval device 1d via the first or second communication path 4pkt or 4tel.

In the content retrieval device 1d, the first or second communication control section Pcc1 or Pcc2 receives the response header Hc via the first or second communication path 4pkt or 4tel, respectively, and passes the response header Hc to the protocol control section Ppc in its current form. The protocol control section Ppc extracts the content type Ictyp from the received response header Hc, and extracts the connection method information Iconn1 pairing with the extracted content type Ictyp from the connection information table Tconn2 (see FIG. 7A) in the connection information management section Pconn1. The protocol control section Ppc determines whether the present content data Dc should be retrieved under the packet switching connection method or the circuit switching connection method according to the extracted connection method information Iconn1. If the connection method information Iconn11 is extracted, the packet switching connection method is determined to be suitable. On the other hand, if the connection method information Iconn12 is extracted, the circuit switching connection method is determined to be suitable.

If the communication path 4 (the first communication path 4pkt or the second communication path 4tel) which is specified by the extracted connection method information Iconn1 is the same as the communication path 4 which was used for the transmission of the header retrieval request Dhreq, the protocol control section Ppc passes the retrieval request Dcreq received from the browser section Pbw to the first or second communication control section Pcc1 or Pcc2 which is presently performing data communication, thereby instructing the first or second communication control section Pcc1 or Pcc2 to retrieve the content data Dc. The first or second communication control section Pcc1 or Pcc2 transmits the retrieval request Dcreq to the content server 3 via the first or second communication path 4pkt or 4tel, respectively, only when instructed to do so by the protocol control section Ppc.

On the contrary, if the communication path 4 which is specified by the extracted connection method information Iconn1 is different from the communication path 4 which was used for the transmission of the header retrieval request Dhreq, the protocol control section Ppc instructs the first or second communication control section Pcc1 or Pcc2 that is presently performing data communication to cut (disconnect) the connection. The protocol control section Ppc then passes the retrieval request Dcreq which is received from the browser section Pbw to the first or second communication control section Pcc1 or Pcc2 which is not presently performing data communication, thereby instructing the first or second communication control section Pcc1 or Pcc2 which is not presently performing data communication to retrieve the content data Dc. The first or second communication control section Pcc1 or Pcc2 disconnects the first or second communication path 4pkt or 4tel which is presently established as the path to the content server 3 only when instructed to disconnect the first or second communication path 4pkt or 4tel by the protocol control section Ppc. The first or second communication control section Pcc1 or Pcc2 establishes the first or second communication path 4pkt or 4tel only when instructed to retrieve the content data Dc by the protocol control section Ppc, and transmits the retrieval request Dcreq to the content server 3.

If the communication path 4 which is used for the transmission of the header retrieval request Dhreq is disconnected, the protocol control section Ppc passes the retrieval request Dcreq which is received from the browser section Pbw to the first or second communication control section Pcc1 or Pcc2 which is specified by the extracted connection method information Iconn11, thereby instructing the first or second communication control section Pcc1 or Pcc2 to retrieve the content data Dc. The first or second communication control section Pcc1 or Pcc2 establishes the first or second communication path 4pkt or 4tel, respectively, as the path to the content server 3 only when instructed to do so by the protocol control section Ppc, and transmits the retrieval request Dcreq to the content server 3. The content server 3 reads the content data Dc based on the locational information Iurl which is specified in the received retrieval request Dcreq, and transmits the read content data Dc to the content retrieval device 1d via the first or second communication path 4pkt or 4tel which is presently used for data communication.

As described above, the content retrieval device 1d retrieves the response header Hc of content data Dc before retrieving the content data Dc, and the control retrieval device 1d is informed of a connection method which is suitable for the retrieval of the present content data Dc by referring to the content type Ictyp which is included in the retrieved response header Hc and the connection information table Tconn2.

In the fourth embodiment, the content type Ictyp is extracted from the response header Hc, and the connection information management section Pconn1 managed the connection method information Iconn1 in association with the content type Ictyp. Alternatively, an attribute of the content data Dc which is included in the response header Hc (for example, the content length Iclg) may be extracted, and the connection information management section Pconn1 may manage the connection method information Iconn1 in association with this attribute of the content data Dc. In particular, when the attribute of the content data Dc is the content length Iclg, the content retrieval device 1d determines the connection method information Iconn1 to be extracted by comparing the length Iclg of the content data Dc to be retrieved presently with the content length Iclg which is managed by the connection information management section Pconn1.

Figure 11:
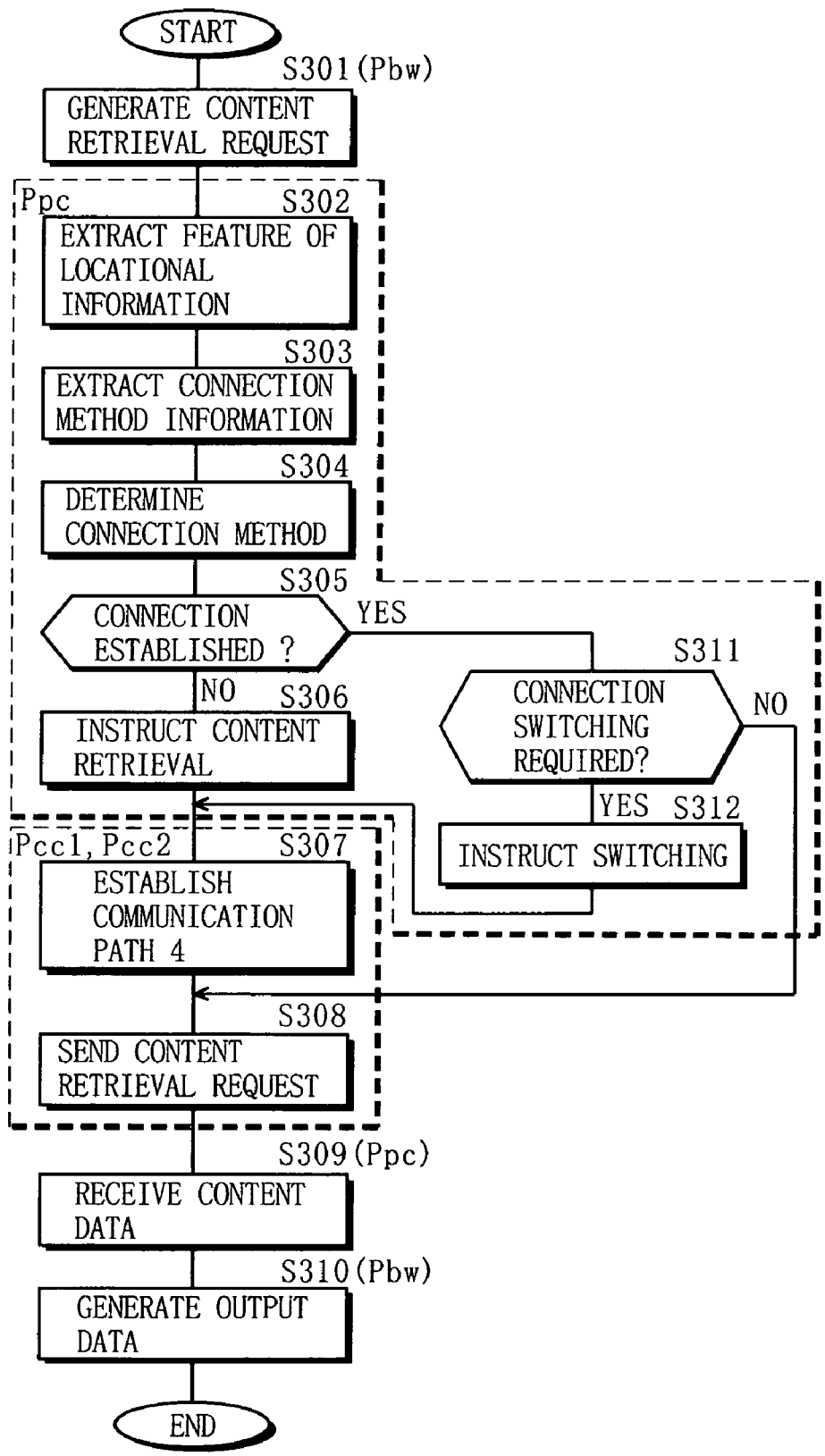
FIG. 11 is a flowchart of the operation of the mobile communication unit Ucomm3.
Figure 13:
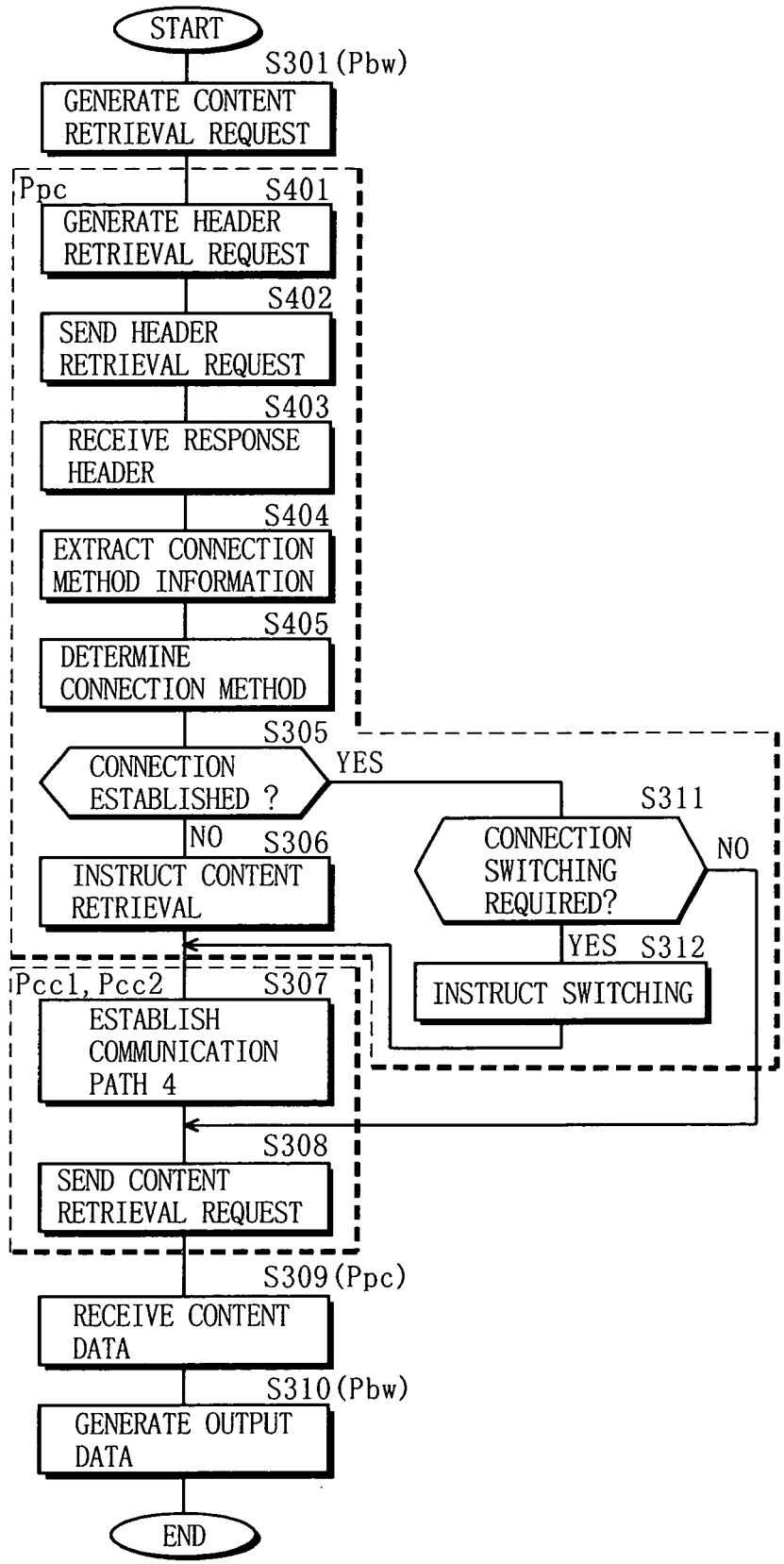
FIG. 13 is a flowchart of the operation of the mobile communication unit Ucomm4.

Hereinafter, a mobile communication unit Ucomm4 incorporating the content retrieval device 1d of the fourth embodiment as described above will now be described. The mobile communication unit Ucomm4 has substantially the same construction as the mobile communication unit Ucomm1. Therefore, FIG. 4 will be referred to in the following description. The operation of the mobile communication unit Ucomm4 will be described with reference to the flowchart of FIG. 13. FIG. 13 is the same as FIG. 11 except that steps S302 to S304 are replaced with steps S401 to S405. In FIG. 13, therefore, steps corresponding to the steps in FIG. 11 are denoted by the same reference numerals, and the description thereof is omitted here.

When the mobile communication unit Ucomm4 is to retrieve the content data Dc, the CPU 11 first reads a program from the ROM 12 to the RAM 13. The program in the fourth embodiment includes the connection information table Tconn2 shown in FIG. 7A in advance. The connection information table Tconn2 is read to the RAM 13 during the reading of the program. Thereafter, the CPU 11 generates a retrieval request (step S301). The CPU 11 then operates as the protocol control section Ppc to generate a header retrieval request Dhreq (step S402).

The CPU 11 passes the generated retrieval request Dhreq to either the first communication control section Pcc1 or the second communication control section Pcc2. If data communication with the content server 3 has already been executed, the CPU 11 passes the generated retrieval request Dhreq to the communication control section which is presently performing data communication, thereby instructing the communication sontrol section which is presently performing data communication to retrieve the response header Hc. In response to the instruction from the CPU 11, the first or second communication control section Pcc1 or Pcc2 transmits the retrieval request Dhreq to the content server 3 via the multiplexer/demultiplexer 16, the transmitter/receiver 17, and the first or second communication path 4pkt or 4tel. On the contrary, data communication with the content server 3 has not already been executed, the CPU 11 passes the generated retrieval request Dhreq to the first communication control section Pcc1. In response, the first communication control section Pcc1 transmits the retrieval request Dhreq to the content server 3 via the multiplexer/demultiplexer 16, the transmitter/receiver 17, and the first communication path 4pkt. In this way, the header retrieval request Dhreq is transmitted to the content server 3 (step S402).

The content server 3 generates the response header Hc and returns the response header Hc to the mobile communication unit Ucomm4 via the first or second communication path 4pkt or 4tel. In the mobile communication unit Ucomm4, the first or second communication control section Pcc1 or Pcc2 receives the response header Hc via the first or second communication path 4pkt or 4tel, the transmitter/receiver 17, and the multiplexer/demultiplexer 16, and stores the response header Hc in the RAM 13 in its current form. In this way, the CPU 11 receives the response header Hc (step S403). The CPU 11 extracts the connection method information Iconn1 pairing with the content type Ictyp in the received response header Hc from the connection information table Tconn2 (see FIG. 7A) in the RAM 13. The CPU 11 determines whether the content data Dc should be retrieved under the packet switching connection method or the circuit switching connection method according to the extracted connection method information Iconn1 (step S405). Subsequently, the mobile communication unit Ucomm4 executes steps S305 through S312 that are substantially the same as those shown in FIG. 11. It should be noted, however, that the content server 3 may transmit only the content data Dc to the mobile communication unit Ucomm4 in response to the content retrieval request Dcreq. Transmission of the response header Hc is not necessarily required.

In the first to fourth embodiments described above, HTML is adopted as the markup language. The content retrieval devices 1a to 1d of the first to fourth embodiment of the present invention can also perform the processing described above for content data Dc which is described in XML (eXtention Markup Language).

While the present invention has been described in detail, the foregoing description is in all aspects illustrative and not restrictive. It is to be understood that numerous other modifications and variations can be devised without departing from the scope of the present invention.

What is claimed is:

1. A content retrieval device for retrieving content data from a server via a communication network, wherein the content data includes locational information of each of sub-content data which is linked to the content data and connection method information indicating a connection method which is suitable for each of the sub-content data, said device comprising:
   a browser section operable to extract the locational information and the connection method information of each of the sub-content data by analyzing the received content data, and to then generate a retrieval request specifying the locational information of the sub-content data to be retrieved presently;
   a protocol control section operable to select, prior to reception of the sub-content data, a suitable connection method for the sub-content data specified by said browser section from among a plurality of connection methods by using a multi-call function, based on the connection method information extracted by said browser section; and
   a communication control section operable to receive the content data specified by said browser section from the server under the connection method selected by said protocol control section, wherein:
   the connection method is either one of a packet switching connection method and a circuit switching connection method;
   the received content data is a text file written in a markup language; and
   said browser section is operable to extract the locational information and the connection method information of each piece of sub-content data from an anchor tag written in the text file.

2. A content retrieval device for retrieving content data from a server via a communication network, wherein content data includes locational information and a file attribute of each of sub-content data linked to the content data, said device comprising:
   a connection information management section operable to manage a connection information table which includes a description of a suitable connection method in association with the file attribute of the content data,
   a browser section operable to extract a set of the locational information and the file attribute of each of the sub-content data by analyzing the received content data, to hold the set as internal information, and to then generate a retrieval request specifying the locational information of the sub-content data to be retrieved presently;
   a protocol control section operable to receive, upon reception of the retrieval request generated by said browser section, the file attribute pairing with the locational information specified in the retrieval request from said browser section, and to select, prior to reception of the content data, the suitable connection method pairing with the file attribute received from said browser section from said connection information management section, from among a plurality of connection methods by using a multi-call function, wherein:
   the connection method is either one of a packet switching connection method and a circuit switching connection method;
   the received content data is a text file written in a markup language; and
   said browser section is operable to extract the locational information and the file attribute of each piece of sub-content data from an anchor tag written in the text file.

3. A content retrieval device for retrieving content data from a server via a communication network, wherein locational information is allocated to content data for indicating a storage location of the content data in the server, part of the locational information representing a feature of the content data, said device comprising:
   a connection information management section operable to manage a connection information table including description of a suitable connection method in association with the feature of the content data,
   a browser section operable to generate a retrieval request specifying locational information of the content data to be retrieved presently;
   a protocol control section operable to receive, upon reception of the retrieval request generated by said browser section, a suitable connection method pairing with the part of the locational information included in the retrieval request from said connection information management section, and to select, prior to reception of the content data, a suitable connection method for the content data specified by said browser section from among a plurality of connection methods by using a multi-call function based on the received suitable connection method from the connection information management section; and
   a communication control section operable to receive the content data specified by said browser section from the server under the connection method selected by said protocol control section, wherein:
   the connection method is either one of a packet switching connection method and a circuit switching connection method;
   the received content data is a text file written in a markup language; and
   said browser section is operable to extract the locational information and the suitable connection method from an anchor tag written in the text file.

4. A content retrieval device for retrieving content data from a server via a communication network, wherein the server is capable of separately transmitting a content header including a file attribute of content data, said device comprising:
   a connection information management section operable to manage a connection information table which includes a description of a suitable connection method in association with the file attribute of the content data;

a browser section operable to generate a first retrieval request specifying locational information of content data to be retrieved presently;

a protocol control section operable to generate a second retrieval request for retrieving only a content header of the content data specified in the first retrieval request, upon reception of the first retrieval request generated by said browser section; and a communication control section operable to receive the content header specified in the second retrieval request generated by said protocol control section, wherein said protocol control section is further operable to select, prior to reception of the content data, a suitable connection method for the content data specified by said browser section among a plurality of connection methods by using a multi-call function, by extracting the suitable connection method pairing with the file attribute included in the content header received by said communication control section from said connection information management section, said communication control section is further operable to receive the content data specified by said browser section from the server under the connection method selected by said protocol control section, the connection method is either one of a packet switching connection method and a circuit switching connection method, the received content data is a text file written in a markup language, and said browser section is operable to extract the locational information and the suitable connection method from an anchor tag written in the text file.

5. A content retrieval method for receiving content data from a server via a communication network, wherein the content data includes locational information of each of sub-content data which is linked to the content data and a connection method which is suitable for each of the sub-content data, said method comprising:

extracting the locational information and the connection method information of each of the sub-content data by analyzing the received content data, and then generating a retrieval request specifying the locational information of the sub-content data to be retrieved presently;

selecting, prior to reception of the sub-content data, a suitable connection method for the sub-content data specified in the retrieval request from among a plurality of connection methods by using a multi-call function, based on the connection method information extracted in said extracting of the locational information and the connection method information; and receiving, from the server, the content data specified to be received presently in said generating of the retrieval request under the connection method selected in said selecting of the suitable connection method, wherein:

wherein the connection method is either one of a packet switching connection method and a circuit switching connection method;

the received content data received is a text file written in a markup language; and said extracting of the locational information and the connection method information extracts the locational information and the connection method information of each piece of sub-content data from an anchor tag written in the text file.

6. A content retrieval method for retrieving content data from a server via a communication network, wherein the content data includes locational information and a file attribute of each of sub-content data which is linked to the content data, said method comprising:

managing a connection information table which includes a description of a suitable connection method in association with the file attribute of the content data;

extracting a set of the locational information and the file attribute of each of the sub-content data by analyzing the received content data, holding the set as internal information, and then generating a retrieval request specifying the locational information of the sub-content data to be retrieved presently; and receiving, upon reception of the retrieval request generated in said generating of the retrieval request, the extracted file attribute pairing with the locational information of the sub-content data specified in the retrieval request, and selecting, from among a plurality of connection methods by using a multi-call function, the suitable connection method from the connection information table pairing with the extracted file attribute, wherein:

the connection method is either one of a packet switching connection method and a circuit switching connection method;

the received content data is a text file written in a markup language; and said extracting of the set of the locational information and the file attribute extracts the locational information and the connection method information of each piece of sub-content data from an anchor tag written in the text file.

7. A content retrieval method for retrieving content data from a server via a communication network, wherein locational information is allocated to the content data for indicating a storage location of the content data in the server, part of the locational information representing a feature of the content data, said method comprising:

managing a connection information table which includes a description of a suitable connection method in association with the feature of the content data;

generating a retrieval request specifying locational information of content data to be retrieved presently;

receiving, upon reception of the retrieval request generated in said generating of the retrieval request, a suitable connection method pairing with the part of the locational information included in the retrieval request from the connection information table, and selecting, prior to reception of the content data, a suitable connection method for the content data specified by the retrieval request from among a plurality of connection methods by using a multi-call function based on the received suitable connection method from the connection information table; wherein:

the connection method is either one of a packet switching connection method and a circuit switching connection method;

the received content data is a text file written in a markup language; and the locational information and the suitable connection method are extracted from an anchor tag written in the text file.

8. A content retrieval method for retrieving content data from a server via a communication network, wherein the server is operable to separately transmit a content header including a file attribute of the content data, said method comprising:

managing a connection information table which includes a description of a suitable connection method in association with the file attribute of the content data;

generating a first retrieval request specifying locational information of the content data to be retrieved presently;

generating, upon reception of the first retrieval requested generated in said generating of the first retrieval request, a second retrieval request for retrieving only a content header of the content data specified in the first retrieval request;

receiving, from the server, the content header specified in the second retrieval request generated in said generating of the second retrieval request; and selecting, prior to reception of the content data, a suitable connection method for the content data specified in the first retrieval request from among a plurality of connection methods by using a multi-call function, by extracting the suitable connection method pairing with the file attribute included in the content header received in said receiving of the content header from the connection information table; wherein:

the connection method is either one of a packet switching connection method and a circuit switching connection method;

the received content data is a text file written in a markup language; and the locational information and the suitable connection method are extracted from an anchor tag written in the text file.

9. A program-recorded recording medium on which a program is recorded for retrieving content data from a server via a communication network, wherein the content data includes locational information of each of sub-content data which is linked to the content data and a connection method which is suitable for each of the sub-content data, said program being operable to perform a method comprising:

extracting the locational information and the connection method information of each of the sub-content data by analyzing the received content data, and then generating a retrieval request specifying the locational information of the sub-content data to be retrieved presently;

selecting, prior to reception of the sub-content data, a suitable connection method for the sub-content data specified in the retrieval request from among a plurality of connection methods by using a multi-call function, based on the connection method information extracted in said extracting of the locational information and the connection method information; and receiving, from the server, the content data specified to be received presently in said generating of the retrieval request under the connection method selected in said selecting of the suitable connection method; wherein:

the connection method is either one of a packet switching connection method and a circuit switching method;

the received content data is a text file written in a markup language; and said extracting of the locational information and the connection method information extracts the locational information and the connection method information of each piece of sub-content data from an anchor tag written in the text file.

10. A program-recorded recording medium on which a program is recorded for retrieving content data from a server via a communication network, wherein the content data includes locational information and a file attribute of each of sub-content data which is linked to the content data, said program being operable to perform a method comprising:

managing a connection information table which includes a description of a suitable connection method in association with the file attribute of the content data;

extracting a set of the locational information and the file attribute of each of the sub-content data by analyzing the received content data, holding the set as internal information, and then generating a retrieval request specifying the locational information of the sub-content data to be retrieved presently; and receiving, upon reception of the retrieval request generated in said generating of the retrieval request, the extracted file attribute pairing with the locational information specified in the retrieval request, and selecting, from among a plurality of connections methods by using a multi-call function, the suitable connection method from the connection information table pairing with the extracted file attribute, wherein:

the connection method is either one of a packet switching connection method and a circuit switching connection method;

the received content data is a text file written in a markup language; and said extracting of the set of the locational information and the file attribute extracts the locational information and the connection method information of each piece of sub-content data from an anchor tag written in the text file.

11. A program recorded recording medium on which a program is recorded for retrieving content data from a server via a communication network, wherein locational information is allocated to the content data for indicating a storage location of the content data in the server, part of the locational information representing a feature of the content data, said program being operable to perform a method comprising:

generating a retrieval request specifying locational information of the content data to be retrieved presently;

managing a connection information table which includes a description of a suitable connection method in association with the feature of the content data;

receiving, upon reception of the retrieval request generated in said generating of the retrieval request, a suitable connection method pairing with the part of the locational information included in the retrieval request from the connection information table, and selecting prior to reception of the content data, a suitable connection method for the content data specified by the retrieval request from among a plurality of connection methods by using a multi-call function based on the received suitable connection information from the connection information table; wherein:

the connection method is either one of a packet switching connection method and a circuit switching connection method;

the received content data is a text file written in a markup language; and the locational information and the suitable connection information are extracted from an anchor tag written in the text file.

12. A program recorded recording medium on which a program is recorded for retrieving content data from a server via a communication network, wherein the server is operable to separately transmit a content header including a file attribute of content data, said program being operable to perform a method comprising:

managing a connection information table which includes a description of a suitable connection method in association with the file attribute of the content data;

generating a first retrieval request specifying locational information of the content data to be retrieved presently;

generating, upon reception of the first retrieval requested generated in said generating of the first retrieval request, a second retrieval request for retrieving only a content header of the receiving, from the server, the content header specified in the second retrieval request generated in said generating of the second retrieval request; and selecting, prior to reception of the content data, a suitable connection method for the content data specified in the first retrieval request from among a plurality of connection methods by using a multi-call function, by extracting the suitable connection method pairing with the file attribute included in the content header received in said receiving of the content header from the connection information table; wherein:

the connection method is either one of a packet switching connection method and a circuit switching connection method;

the received content data is a text file written in a markup language; and the locational information and the suitable connection method are extracted from an anchor tag written in the text file.

* * * * *

UNITED STATES PATENT AND TRADEMARK OFFICE
CERTIFICATE OF CORRECTION

PATENT NO. : 7,185,068 B2  Page 1 of 1
APPLICATION NO. : 09/808045
DATED : February 27, 2007
INVENTOR(S) : Takuya Kobayashi et al.

It is certified that error appears in the above-identified patent and that said Letters Patent is hereby corrected as shown below:

In column 25, line 55, please change "wherein the connection" to --the connection--.

In column 27, line 53, please change "method; wherein:" to --method, wherein:--.

In column 29, line 10, please change "header of the" to --header--.

Signed and Sealed this

Twelfth Day of June, 2007

JON W. DUDAS
*Director of the United States Patent and Trademark Office*